United States Patent Office 3,555,023
Patented Jan. 12, 1971

3,555,023
1-(3 - AMINOPYRAZINOYL) - 3 - SUBSTITUTED-3-THIOISOSEMICARBAZIDES AND METHOD FOR PREPARATION
Edward J. Cragoe, Jr., Lansdale, and Kenneth L. Shepard, Ambler, Pa., assignors to Merck & Co., Inc., Rahway, N.J., a corporation of New Jersey
No Drawing. Filed Nov. 13, 1968, Ser. No. 775,542
Int. Cl. C07d 51/76
U.S. Cl. 260—250                        10 Claims

ABSTRACT OF THE DISCLOSURE

1 - (3 - aminopyrazinoyl) - 3 - substituted - 3 - thioisosemicarbazides are described that can be optionally substituted in the 5- and/or 6-position of the pyrazinoyl moiety and additionally optionally substituted on the terminal nitrogen of the semicarbazide moiety. These compounds are prepared either by alkylation of the 1-(3-aminopyrazinoyl)thiosemicarbazide or by the reaction of a 3-substituted - 3 - thioisosemicarbazide and a 3-(3-aminopyrazinoyloxy)-acrylamide which in turn is prepared by reaction between a pyrazinoic acid and an isoxazolium salt. The products possess saluretic and diuretic properties and therefore are useful in the treatment of conditions associated with abnormal retention of fluid and/or sodium and chloride ions such as the treatment or management of edematous conditions.

---

This invention is concerned with novel 1-(3-aminopyrazinoyl) - 3 - substituted - 3 - thioisosemicarbazides that possess useful saluretic and diuretic properties as well as novel processes for their preparation. The products of this invention are useful therefore in the treatment or management of edema and other abnormalities resulting from the retention of excess quantities of sodium and fluid by the animal organism.

The 1-(3-aminopyrazinoyl)-3-substituted-3-thioisosemicarbazides of this invention have the structural formula

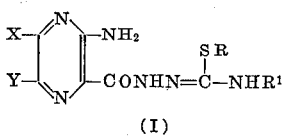

(I)

and includes the pharmacologically acceptable salts thereof wherein

X is selected from hydrogen and amino of the structure NR$^5$R$^6$ wherein NR$^5$R$^6$ represents an unsubstituted or a substituted amino group wherein R$^5$ is selected from
  (1) hydrogen,
  (2) alkyl, preferably lower alkyl or from 1 to about 6 carbon atoms either straight or branched chain and either saturated or unsaturated, e.g., methyl, ethyl, propyl, isopropyl, allyl, propenyl, butyl, isobutyl, secondary butyl, pentyl, isopentyl neopentyl, hexyl and the like,
R$^6$ is selected from
  (1) hydrogen,
  (2) alkenyl, preferably lower alkenyl of from 3 to about 5 carbon atoms, e.g., allyl, propenyl or the like,
  (3) alkynyl, preferably lower alkynyl of from 3 to 5 carbon atoms, e.g., propargyl and the like,
  (4) lower cycloalkyl of from 3 to about 7 carbon atoms, e.g., cyclopropyl, cyclopentyl, cyclohexyl, cycloheptyl and the like, (5) mononuclear aryl, especially phenyl, either unsubstituted or substituted, such as with halo, e.g., chloro, bromo, or fluoro, lower alkyl of from 1 to about 3 carbon atoms, e.g., methyl, ethyl, and propyl, or lower alkoxy, e.g., methoxy, ethoxy, propoxy, and the like,
  (6) lower alkoxy, preferably lower alkoxy of from 1 to 4 carbon atoms, e.g., methoxy, ethoxy, isopropoxy and the like,
  (7) substituted amino selected from pyridylamino and pentamethyleneamino,
  (8) alkyl, preferably lower alkyl of from 1 to about 6 carbon atoms either straight or branched chain such as methyl, ethyl, propyl, isopropyl, butyl, isobutyl, secondary butyl, tertiary butyl, pentyl, isopentyl, neopentyl, hexyl and the like, either unsubstituted or substituted with one or more substituents selected from
    (a) lower alkoxy of from 1 to about 3 carbon atoms, e.g., methoxy, ethoxy, propoxy and the like,
    (b) lower cycloalkyl of from 3 to about 6 carbon atoms, e.g., cyclopropyl, cyclopentyl, cyclohexyl and the like,
    (c) heterocyclic group of 5 or 6 nuclear members and containing one or more hetero atoms selected from oxygen and nitrogen, especially furyl and pyridyl,
    (d) mononuclear aryl, especially phenyl, either unsubstituted or substituted with such as halo, e.g., chloro, bromo, or fluoro, lower alkyl of from 1 to about 3 carbon atoms, e.g., methyl, ethyl, or propyl, or lower alkoxy of from 1 to about 3 carbon atoms, e.g., methoxy ethoxy, propoxy and the like,
    (e) —NR$^7$R$^8$ wherein R$^7$ is selected from
      (1) alkyl, preferably lower alkyl of from 1 to about 5 carbon atoms, e.g., methyl, ethyl, propyl, isopropyl, butyl, isobutyl, secondary butyl, pentyl, isopentyl, neopentyl and the like,
      (2) lower alkylcarbonyl, of from 2 to about 3 carbons, e.g., acetyl, propionyl, and the like,
      R$^8$ is alkyl, preferably lower alkyl of from 1 to about 5 carbon atoms, e.g., methyl, ethyl, propyl, isopropyl, butyl, isobutyl, secondary butyl, pentyl, isopentyl, neopentyl, and the like, R$^7$ and R$^8$ when lower alkyl can be linked together either directly or through a hetero atom such as nitrogen or oxygen to form a heterocyclic ring with the nitrogen to which they are attached, e.g., piperidino, pyrrolidinyl, morpholino, piperazinyl, N-lower alkyl piperazinyl, and the like;
  R$^5$ and R$^6$ when lower alkyl can be linked together either directly or through a hetero atom such as nitrogen or oxygen to form a heterocyclic ring with the nitrogen atom to which they are attached forming, e.g., piperidino, pyrrolidinyl, morpholino, piperazinyl, N-lower alkylpiperazinyl, and the like;
Y is hydrogen, halogen, preferably chloro, bromo or iodo, phenyl, lower alkyl;
R is selected from lower alkyl and phenyl-lower alkyl, lower alkyl-phenyl-lower alkyl, halophenyl-lower alkyl, especially chloro- and bromophenyl-lower alkyl; and
R$^1$ is selected from hydrogen, lower alkyl, lower alkenyl, phenyl, halo(chloro or bromo)-phenyl, and mono- or di-phenyl-lower alkyl (C$_{1-3}$).

In the foregoing definitions unless otherwise noted, the lower alkyl radicals advantageously have from 1 to 5 carbon atoms and are either straight or branched chain, the lower alkenyl radicals have from 3 to 5 carbon atoms and the cycloalkyl radicals have from 3 to 6 nuclear carbons and are selected from cyclopropyl, cyclobutyl, cyclopentyl and cyclohexyl.

The products of this invention are prepared either by alkylation of the desired 1-(3-aminopyrazinoyl)-thiosemicarbazide or by reacting a 3-substituted-3-thioisosemicarbazide with a very reactive 3-(3-aminopyrazinoyloxy)acrylamide which itself is prepared by reaction between a pyrazinoic acid and an isoxazolium salt.

The preparation of the compounds by the alkylation of the 1-(3-aminopyrazinoyl)-thiosemicarbazide can be illustrated by the following reaction scheme:

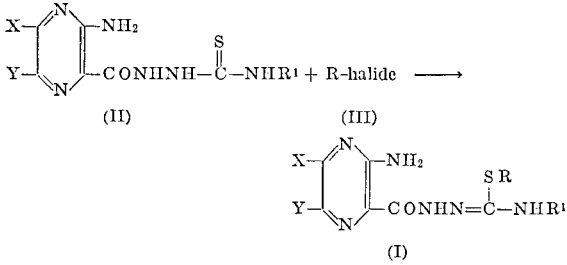

The above reaction readily takes place between the thiosemicarbazide II and the alkylating agent III at room temperature. Advantageously compound II is dissolved in aqueous base and the R-halide (III) in an alkanol is added. When the basic substance is omitted from the reaction mixture, product I is obtained as a hydrohalide salt which, if desired, can be converted to the free base by conventional methods.

The thiosemicarbazide II is prepared by the reaction of a 3-aminopyrazinoic acid hydrazide with an isothiocyanate according to the following scheme:

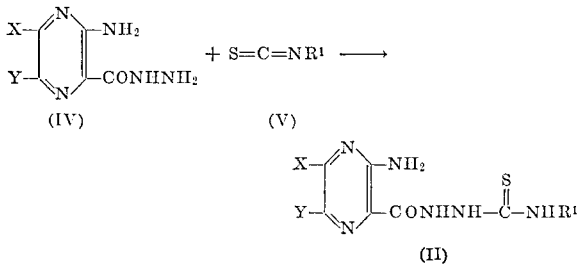

This reaction preferably is carried out in the presence of a solvent and with heating from about steam bath temperature up to the reflux temperature of the reaction mixture. The reactants can be employed in equimolecular quantity although an excess of one or the other can be employed, usually an excess of the isothiocyanate, V. Solvents such as lower alkanols, acetonitrile, acetic acid, dilute hydrochloric acid or pyridine can be employed for the reaction medium although other usual solvents can be used as well.

Although many of the pyrazinoic acid hydrazides, IV, are known compounds, those that are not known can be prepared by known methods including reaction of an alkyl pyrazinoate and hydrazine.

The intermediate esters generally are prepared by one of the processes shown below. Many esters, however, previously have been described, some of which were made by methods other than those illustrated below which methods would also be useful in preparing other desired ester starting materials.

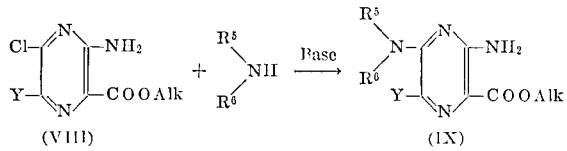

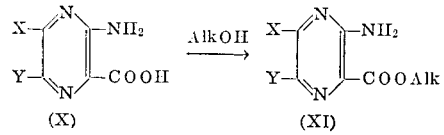

Alternatively, the products of this invention can be prepared by the reaction of the 3-substituted-3-thioisosemicarbazide and 3-(3-aminopyrazinoyloxy)acrylamide according to the following reaction scheme:

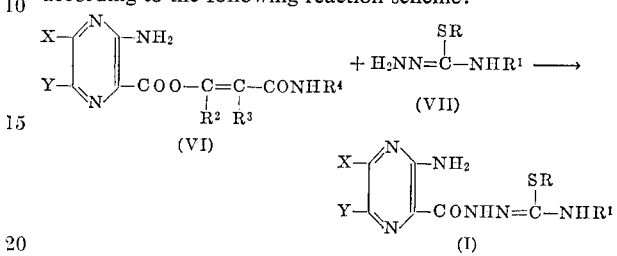

wherein X, Y, R and $R^1$ have the meaning assigned above, $R^2$ represents lower alkyl having from 1 to about 3 carbon atoms or unsubstituted or substituted phenyl, wherein the substituent is a lower alkyl having 1 to 3 carbons or a sulfonate ($-SO_3^-$); $R^3$ represents hydrogen or a hydrocarbon radical which when linked to $R^2$ forms with the carbon atoms to which $R^2$ and $R^3$ are joined an ortho-phenylene group; and $R^4$ represents lower alkyl ($C_{1-5}$). The above reaction is carried out by mixing the acrylamide, VI, with the 3 - substituted-3-thioisosemicarbazide, VII, in either equimolecular proportions or if desired the thioisosemicarbazide can be employed in excess. As reaction medium a lower alkanol, preferably isopropanol or tertiary butanol, is employed although other solvents such as dimethylformamide, dioxane, dichloromethane, tetrahydrofuran, acetonitrile and the like can be used. The reaction can be carried out at room temperature although it is facilitated with heating up to about reflux temperatures.

The acrylamide, VI, can be prepared from a 3-aminopyrazinoic acid and an isoxazolium salt according to the following reaction scheme:

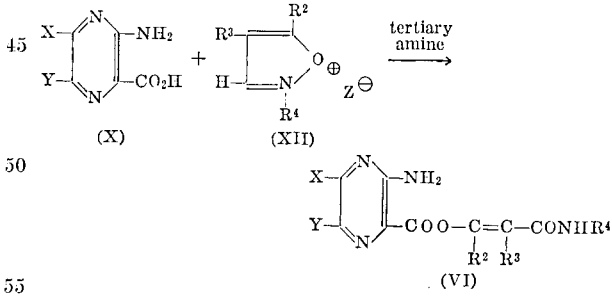

The X, Y and R's in the above structures have the meanings assigned above. Z is a salt forming anion, and advantageously can be the perchlorate or 2,4-dinitrophenylsulfonate. Approximately equivalent amounts of the pyrazinoic acid, X, an isoxazolium salt, XII, and a tertiary amine are dissolved in a solvent and stirred to form the acrylamide, VI.

Generally the pyrazinoic acid and tertiary amine, such as a tri(loweralkyl)amine, e.g., trimethylamine, triethylamine, tripropylamine or the like are dissolved in a solvent such as dimethylformamide, dimethyl sulfoxide and dimethyl sulfone, acetonitrile or tetrahydrofuran, and stirred for a period of from a few minutes to several hours. The isoxazolium salt then is added and the mixture stirred from about 1 to about 4 hours, usually about 2 hours at ambient temperature, although gentle heating up to about 50° C. can be employed. The acylamide, VI, usually is sufficiently stable to be isolated and purified, and often is isolated simply by diluting the reaction mixture with water which precipitates the 3-(3-aminopyrazinoyloxy)acrylamide. Alternatively, the acrylamide, VI, can be obtained by evaporation of the reaction mixture.

The intermediate pyrazinoic acids, X, generally are prepared by the hydrolysis of the corresponding alkyl esters, XI. The hydrolysis usually is carried out using a solution of aqueous base, such as, sodium hydroxide or potassium hydroxide and a solvent such as, isopropyl alcohol, ethanol and the like, and refluxing the mixture for one to 10 hours. The pyrazinoic acid then is isolated by cooling and acidifying the mixture with an acid, such as hydrochloric acid, sulfuric acid and the like .

If desired, salts of the novel products, I, of this invention can be prepared by conventional methods such as dissolving product I in alcohol and adding the desired acid.

The products of this invention can be administered to man or animals in the form of pills, tablets, capsules, elixirs, injectable preparations and the like and can comprise one or more of the compounds of this invention as the only essential active ingredient of the pharmaceutical formulation, or the novel product(s) can be combined in pharmaceutical formulations with other diuretic agents or indeed other therapeutic agents. The products of this invention advantageously are administered at a dosage range of from about 5 mgs. per day to about 750 mgs. per day or at a somewhat higher or lower dosage at the physician's discretion, preferably in subdivided amounts on a 2 to 4 times a day regimen. These formulations can be prepared by the usual methods for making unit dosage forms of compounds for oral or parenteral administration.

In the following text illustrative methods for making intermediates and their use in preparing the novel products of this invention are detailed in the following order:

THIOSEMICARBAZIDE METHOD (A) Preparation of the alkyl 3-amino-5-X-6-Y-pyrazinoates,
(B) Preparation of the hydrazides from the pyrazinoates of (A),
(C) Preparation of the pyrazinoylthiosemicarbazides from the hydrazides of (B),
(D) Examples illustrative of the preparation of the novel pyrazinoylthioisosemicarbazides of this invention from said pyrazinoylthiosemicarbazides.

ACRYLAMIDE METHOD (E) Preparation of pyrazinoic acids from the esters of (A) or other known esters,
(F) Preparation of the pyrazinoylacrylamides from the pyrazinoic acids of (E) and an isoxazolium salt,
(G) Examples illustrating the preparation of the novel pyrazinoylthioisosemicarbazides of this invention from said pyrazinoylacrylamides.

(A) Preparation of alkyl 3-amino-5-X-6-Y-pyrazinoates (A–1) Methyl 3-amino-5-dimethylamino-6-chloropyrazinoate.—A suspension of methyl 3-amino-5,6-dichloropyrazinoate (178 g., 0.8 mole) in 2-propanol (1.1 liters) is stirred while dimethylamine (200 g., 4.44 moles) in 2-propanol (2 liters) is added, and then the mixture is refluxed for an hour. The product that separates is removed by filtration and dried. The yield is 177.2 g. (97%). After recrystallization from methanol the methyl 3-amino-5-dimethyl-amino-6-chloropyrazinoate melts at 145.5–146.5° C.

Analysis.—Calculated for $C_8H_{11}ClN_4O_2$ (percent): C, 41.66; H, 4.81; N, 24.29. Found (percent): C, 41.73; H, 4.52; N, 24.24.

(A–2) Preparation of methyl 3-amino-5-(2,2-pentamethylenehydrazino)-6-chloropyrazinoate.—A mixture of methyl 3-amino-5,6-dichloropyrazinoate (22.2 g., 0.1 mole), N-aminopiperidine (10.0 g., 0.1 mole), triethylamine (15 ml.), and dimethyl sulfoxide (100 ml.) is warmed on the steam bath with stirring for three hours. The solution is diluted with water (350 ml.) and the solid that separates is collected and dried yielding 25.6 g. of methyl 3-amino-5-(2,2-pentamethylenehydrazino)-6-chloropyrazinoate, M.P. 195–202° C. Recrystallization from acetonitrile or butyl chloride gives material with M.P. 207–209° C.

Analysis.—Calculated for $C_{11}H_{16}ClN_5O_2$ (percent): C, 46.24; H, 5.65; N, 24.51. Found (percent): C, 46.39; H, 5.63; N, 24.73.

(A–3) Preparation of methyl 3-amino-5-[2-(2-pyridyl)hydrazino] - 6 - chloropyrazinoate.—A mixture of methyl 3-amino-5,6-dichloropyrazinoate (22.2 g., 0.10 mole), 2-hydrazinopyridine (11.0 g., 0.10 mole), triethylamine (22 ml.), and dimethyl sulfoxide (100 ml.) is heated on the steam bath for three and one-half hours. The reaction mixture is diluted with water (250 ml.) and the solid that forms is collected and dried, yielding 29.8 g. of methyl 3-amino-5-[2-(2-pyridyl)hydrazino] 6-chlopyrazinoate M.P. 201–205° C. Recrystallization from acetonitrile gives material with M.P. 203–206° C.

Analysis.—Calculated for $C_{11}H_{11}ClN_6O_2$ (percent): C, 44.83; H, 3.76; N, 28.52. Found (percent): C, 44.88; H, 3.79; N, 28.82.

By employing substantially the same method described in (A–1), above, but substituting for the dimethylamine, equimolar quantities of the amines identified in Table I there is obtained the corresponding methyl 3-amino-5-substituted-amino-6-chloropyrazinoate products identified in Table I according to Equation A.

TABLE I.—EQUATION A

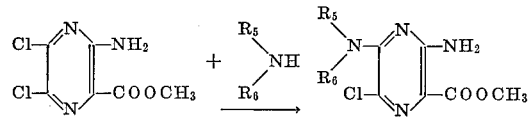

| | | M.P., °C. | Product | | | | | |
|---|---|---|---|---|---|---|---|---|
| | | | | | Analysis | | | |
| | | | | Calculated | | | Found | | |
| $R^5$ | $R^6$ | | Formula | C | H | N | C | H | N |
| Preparation: | | | | | | | | | |
| A–4 | CH≡C—CH$_2$— | H | 168–169 | $C_9H_9ClN_4O_2$ | 44.92 | 3.77 | 23.28 | 44.82 | 3.73 | 23.09 |
| A–5 | CH$_3$OCH$_2$CH$_2$— | H | 142–144 | $C_9H_{13}N_4O_3Cl$ | 41.47 | 5.03 | 21.49 | 41.56 | 5.03 | 21.38 |
| A–6 | ![pyridylmethyl]—CH$_2$— | H | 190–191 | $C_{12}H_{12}ClN_5O_2$ | 49.07 | 4.12 | 23.85 | 49.39 | 4.06 | 23.88 |

TABLE I—Continued

| | | | | | Product | | | | | |
|---|---|---|---|---|---|---|---|---|---|---|
| | | | | | | Analysis | | | | |
| | | | | | | Calculated | | | Found | |
| $R^5$ | $R^6$ | M.P., °C. | Formula | C | H | N | C | H | N |

| | $R^5$ | $R^6$ | M.P., °C. | Formula | C calc | H calc | N calc | C found | H found | N found |
|---|---|---|---|---|---|---|---|---|---|---|
| Preparation: | | | | | | | | | | |
| A-7 | (pyridyl)-CH$_2$— | H | 170–171 | $C_{12}H_{12}N_5O_2Cl$ | 49.07 | 4.12 | 23.85 | 49.36 | 4.18 | 23.61 |
| A-8 | CH$_3$CONH(CH$_2$)$_2$— | H | 208–210 | $C_{10}H_{14}N_5O_3Cl$ | 41.75 | 4.90 | 24.34 | 42.04 | 4.85 | 24.69 |
| A-9 | CH$_3$—N(COCH$_3$)—(CH$_2$)$_2$— | H | 175–179 | $C_{11}H_{16}ClN_5O_3$ | ---- | ---- | ---- | 44.21 | 5.07 | ---- |
| A-10 | CH$_3$CONH(CH$_2$)$_3$— | H | 180–182 | $C_{11}H_{16}N_5O_3Cl$ | 43.78 | 5.35 | ---- | 44.21 | 5.07 | ---- |
| A-11 | (C$_2$H$_5$)$_2$NCH$_2$CH$_2$— | H | 114–116 | $C_{12}H_{20}N_5O_2Cl$ | 47.76 | 6.68 | 23.21 | 47.88 | 6.63 | 23.13 |
| A-12 | (C$_2$H$_5$)$_2$N(CH$_2$)$_2$— | CH$_3$— | 51–54 | $C_{13}H_{22}ClN_5O_2$ | 49.44 | 7.02 | 22.18 | 49.65 | 6.67 | 22.30 |
| A-13 | (CH$_3$)$_3$N—(CH$_2$)$_3$— | H | 108–109 | $C_{11}H_{18}N_5O_2Cl$ | 45.91 | 6.30 | 24.34 | 46.30 | 6.26 | 24.43 |
| A-14 | (CH$_3$)$_2$N(CH$_2$)$_4$— | H | 170–171 | $C_{12}H_{20}ClN_5O_2$·HCl | 42.61 | 6.20 | ---- | 42.40 | 5.67 | ---- |
| A-15 | (pyrrolidinyl)N—(CH$_2$)$_2$— | H | 121–122 | $C_{12}H_{18}N_5O_2Cl$ | 48.08 | 6.05 | 23.37 | 48.31 | 6.40 | 23.76 |
| A-16 | CH$_3$N(piperazinyl)N(CH$_2$)$_3$— | H | 148–149 | $C_{14}H_{23}N_6O_2Cl$ | 49.05 | 6.76 | 24.52 | 48.95 | 6.64 | 24.50 |
| A-17 | O(morpholinyl)N(CH$_2$)$_3$— | H | 158–160 | $C_{13}H_{20}N_5O_3Cl$ | 47.34 | 6.11 | 21.24 | 47.41 | 6.04 | 21.17 |
| A-18 | CH$_3$(CH$_2$)$_2$— | CH$_3$— | 83–85 | $C_{10}H_{15}N_4ClO_2$ | 46.42 | 5.84 | 21.66 | 46.55 | 5.75 | 21.70 |
| A-19 | (CH$_3$)$_2$N(CH$_2$)$_3$— | CH$_3$— | 202–203 | $C_{12}H_{20}ClN_5O_2$(HCl) | 42.61 | 6.26 | 20.71 | 42.51 | 6.09 | 21.02 |
| A-20 | —CH$_2$CH$_2$—N(C$_2$H$_5$)—CH$_2$CH$_2$— | | 143–145 | $C_{12}H_{18}N_5O_2Cl$ | 48.08 | 6.05 | 23.36 | 47.97 | 6.11 | 23.19 |
| A-21 | —CH$_2$CH$_2$O—CH$_2$CH$_3$— | | 197–198 | $C_{10}H_{13}N_4O_3Cl$ | 44.04 | 4.80 | 20.55 | 44.32 | 4.74 | 20.67 |
| A-22 | CH$_3$(n-C$_4$H$_9$)N(CH$_2$)$_2$— | H | 157–158 | $C_{17}H_{26}ClN_5O_6$ (maleate) | 47.28 | 6.07 | 16.22 | 47.43 | 6.06 | 16.52 |

The following compounds also are prepared by the method described in (A–1), above, by replacing the dimethylamine with an equimolecular quantity of (A–23) 2-(N-acetyl-N-ethylamino)ethylamine
(A–24) 2-piperidinoethylamine
(A–25) 3-piperidinopropylamine thereby forming:

(A–23) Methyl 3-amino-5-[2-(N-acetyl-N-ethylamino) ethylamino]-6-chloropyrazinoate
(A–24) Methyl 3-amino-5-(piperidinoethylamino)-6-chloropyrazinoate and
(A–25) Methyl 3-amino-5-(3-piperidinopropylamino)-6-chloropyrazinoate (B) Preparation of 3-amino-5-X-6-Y-pyrazinoic acid hydrazides (B–1) 3-amino-5-diethylamino-6-chloropyrazinoic acid hydrazide.— Hydrazine (20 ml. of 64% aqueous solution) is added to a solution of methyl 3-amino-5-diethylamino-6-chloropyrazinoate (10.0 g., 0.04 mole) in ethanol (250 ml.) and the reaction mixture is refluxed for 4 hours. The solvent is then removed in vacuo and the residue washed out with water and dried to yield 9.0 g. (87%) of 3-amino-5-diethylamino-6-chloropyrazinoic acid hydrazide melting at 137–140° C. After crystallization from 2-propanol the compound melts at 142–145° C.

Analysis.—Calculated for $C_9H_{15}N_6ClO$ (percent): C, 41.79; H, 5.84; N, 32.49. Found (percent): C, 42.00; H, 6.05; N, 32.10.

(B–2) Preparation of 3-amino-5-(2,2-pentamethylenehydrazino)-6-chloropyrazinoic acid hydrazide.—A mixture of methyl 3-amino-5-(2,2-pentamethylenehydrazino)-6-chloropyrazinoate (2.86 g., 0.01 mole), hydrazine (95%, 0.68 g.), dimethylformamide (5 ml.), and ethanol (30 ml.) is heated in the steam bath with stirring for 5 hours then cooled to room temperature. The white solid is collected, washed with a little ethanol, and dried to yield 1.97 g. of 3-amino-5-(2,2-pentamethylenehydrazino)-6-chloropyrazinoic acid hydrazide, M.P. 218–221° C. Recrystallization from ethanol gives material melting at 221–222° C.

Analysis.—Calculated for $C_{10}H_{16}ClN_7O$ (percent): C, 42.03; H, 5.64; N, 34.32. Found (percent): C, 42.01; H, 5.71; N, 34.38.

(B–3) Preparation of 3-amino-5-[2-(2-pyridyl)hydrazino]-6-chloropyrazinoic acid hydrazide.—A mixture of methyl-3-amino-5-[2-(2-pyridyl)hydrazino] - 6 - chloropyrazinoate (11.75 g., 0.04 mole), hydrazine (64% in water, 50 ml.), and ethanol (175 ml.) is heated to reflux for four hours. The mixture is diluted with water (100 ml.) and the solid collected and dried at 70° C., yielding 11.52 g. of 3-amino-5-[2-(2-pyridyl)hydrazino]-6-chloropyrazinoic acid hydrazide, M.P. 229–232° C. (dec.). Recrystallization from 50% aqueous dimethylformamide gives material with M.P. 230–233° C. (dec.).

Analysis.—Calculated for $C_{10}H_{11}ClN_8O$ (percent): C, 40.75; H, 3.76; N, 38.03. Found (percent): C, 40.90; H, 3.73; N, 38.34.

By employing substantially the method described in (B–1), above, but substituting for methyl 3-amino-5-diethylamino-6-chloropyrazinoate equimolar quantities of the methyl pyrazinoates identified in Table II there is produced the corresponding pyrazinoic acid hydrazides, also identified in Table II for each of which physical constants are provided under "End Products," according to Equation B.

TABLE II.—EQUATION B

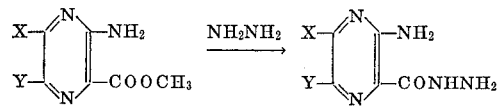

| Preparation | Ester from Prepn.† | X | Y | M.P., °C. | Formula | Calculated C | Calculated H | Calculated N | Found C | Found H | Found N |
|---|---|---|---|---|---|---|---|---|---|---|---|
| B-4 | | NH₂— | Cl | 260-1 | C₅H₇ClN₆O | 29.64 | 3.48 | 41.48 | 30.18 | 3.44 | 41.61 |
| B-5 | | CH₃NH— | Cl | 257-60 | Compound not purified | | | | | | |
| B-6 | | C₂H₅NH— | Cl | 168-70 | C₇H₁₁N₆ClO | 36.45 | 4.80 | 36.44 | 36.71 | 4.87 | 36.71 |
| B-7 | | n-C₃H₇NH— | Cl | 171-3 | C₈H₁₃N₆ClO | 39.27 | 5.35 | 34.35 | 39.33 | 5.38 | 34.46 |
| B-8 | | CH₂=CHCH₂NH— | Cl | 158-60 | C₈H₁₁N₆ClO | 39.59 | 4.57 | 34.63 | 39.66 | 4.77 | 34.65 |
| B-9 | | n-C₄H₉NH— | Cl | 162-5 | C₉H₁₅N₆ClO | 41.78 | 5.84 | 32.49 | 42.10 | 6.01 | 32.63 |
| B-10 | | (CH₃)₂CHNH— | Cl | 132-4 | C₈H₁₃N₆ClO | 39.27 | 5.36 | 34.25 | 39.00 | 5.50 | 34.35 |
| B-11 | | (CH₃)₃C—NH— | Cl | 192-3 | C₉H₁₅ClN₆O | 41.78 | 5.84 | 32.49 | 41.44 | 5.65 | 32.47 |
| B-12 | | cyclopentyl-NH— | Cl | 143-5 | C₁₀H₁₅N₆ClO | 44.36 | 5.58 | 31.05 | 44.52 | 5.71 | 30.85 |
| B-13 | A-9 | CH₃N(COCH₃)—(CH₂)₂NH— | Cl | 161-162 | C₁₀H₁₆ClN₇O₂ | 39.80 | 5.35 | 32.50 | 40.17 | 5.17 | 32.25 |
| B-14 | A-5 | CH₃OCH₂CH₂NH— | Cl | 151-3 | C₈H₁₁ClN₆O₂ | 36.86 | 5.03 | 32.24 | 36.92 | 4.83 | 32.18 |
| B-15 | | Cl—C₆H₄—CH₂NH— | Cl | 158-60 | C₁₂H₁₂N₆Cl₂O | 44.05 | 3.70 | 25.69 | 43.86 | 3.75 | 25.61 |
| B-16 | A-6 | (2-pyridyl)-CH₂NH— | Cl | 213-4 | C₁₁H₁₂ClN₇O | 44.98 | 4.12 | 33.38 | 45.27 | 4.03 | 33.62 |
| B-17 | A-7 | (3-pyridyl)-CH₂NH— | Cl | 191-2 | C₁₁H₁₂ClN₇O | 44.98 | 4.12 | 33.38 | 45.33 | 4.39 | 33.68 |
| B-18 | | (4-pyridyl)-CH₂NH— | Cl | 208-10 | C₁₁H₁₂ClN₇O | 44.98 | 4.12 | 33.38 | 45.34 | 4.24 | 33.70 |
| B-19 | A-8 | CH₃C(O)—NH(CH₂)₂NH— | Cl | 245-8 | C₉H₁₄ClN₇O₂ | 37.57 | 4.90 | 34.08 | 37.77 | 4.93 | 34.37 |
| B-20 | A-12 | (C₂H₅)₂N(CH₂)₂N(CH₃)— | Cl | 116-117 | C₁₂H₂₂ClN₇ | 45.63 | 7.02 | 31.05 | 45.42 | 6.77 | 31.36 |
| B-21 | A-10 | CH₃CONH(CH₂)₃NH— | Cl | 220-1 | C₁₀H₁₆ClN₇O | 39.80 | 5.35 | 32.50 | 40.06 | 5.37 | 32.40 |
| B-22 | | (CH₃)₂N—CH₂CH₂NH— | Cl | 161-3 | C₉H₁₆N₇ClO | 39.49 | 5.89 | 35.82 | 39.86 | 5.94 | 36.04 |
| B-23 | A-11 | (C₂H₅)₂N(CH₂)₂NH— | Cl | 95-7 | Compound not purified | | | | | | |
| B-24 | A-19 | (CH₃)₂N(CH₂)₃N(CH₃)— | Cl | 77-88 | C₁₁H₂₀ClN₇O | 43.78 | 6.68 | 32.49 | 43.94 | 6.50 | 32.45 |
| B-25 | A-13 | (CH₃)₂N(CH₂)₃NH— | Cl | 152-4 | C₁₀H₁₈ClN₇O | 41.74 | 6.30 | 34.08 | 41.90 | 6.41 | 34.46 |
| B-26 | A-14 | (CH₃)₂N(CH₂)₄NH— | Cl | 113-5 | C₁₁H₂₀ClN₇O | 43.78 | 6.63 | 32.49 | 44.13 | 6.48 | 33.03 |
| B-27 | A-15 | (pyrrolidino)-CH₂CH₂NH— | Cl | 120-1 | C₁₁H₁₈ClN₇O | 44.07 | 6.07 | 32.71 | 44.03 | 5.97 | 32.92 |
| B-28 | A-16 | CH₃—N(piperazino)—(CH₂)₃NH— | Cl | 167-9 | C₁₃H₂₃ClN₈O | 45.54 | 6.76 | 32.69 | 45.50 | 6.73 | 32.48 |
| B-29 | A-17 | O(morpholino)N—(CH₂)₃NH— | Cl | 183-4 | C₁₂H₂₀ClN₇O₂ | 43.70 | 6.11 | 29.73 | 44.24 | 6.17 | 29.00 |
| B-30 | | C₆H₅—NH— | Cl | 194-5 | C₁₁H₁₁ClN₆O | 47.40 | 3.98 | 30.16 | 47.39 | 4.02 | 30.32 |

TABLE II—Continued

| Preparation | Ester from Prepn.[1] | X | Y | End Product M.P., °C. | Formula | Calculated C | Calculated H | Calculated N | Found C | Found H | Found N |
|---|---|---|---|---|---|---|---|---|---|---|---|
| B-31 | A-1 | (CH$_3$)$_2$N— | Cl | 193-5 | C$_7$H$_{11}$ClN$_6$O | 36.45 | 4.81 | 36.44 | 36.51 | 5.01 | 36.84 |
| B-32 | | CH$_3$\N—/CH$_3$ | ⟨phenyl⟩— | 153-4 | C$_{13}$H$_{16}$N$_6$O | 57.34 | 5.92 | 30.86 | 57.77 | 5.81 | 30.71 |
| B-33 | | CH$_3$\N—/C$_2$H$_5$ | Cl | 13-46 | C$_8$H$_{13}$N$_6$ClO | 39.27 | 5.36 | 34.35 | 39.36 | 5.51 | 34.39 |
| B-34 | A-18 | CH$_3$\N—/C$_3$H$_7$ | Cl | 133-6 | C$_9$H$_{15}$ClN$_6$O | 41.78 | 5.84 | 32.49 | 41.92 | 5.84 | 32.31 |
| B-35 | A-22 | CH$_3$\N(CH$_2$)$_2$NH—/n-C$_4$H$_9$ | Cl | 88 | C$_{12}$H$_{22}$ClN$_7$O | 45.63 | 7.02 | 31.05 | 45.72 | 6.73 | 31.43 |
| B-36 | | ⟨N—⟩ | Cl | 181-2 | C$_9$H$_{13}$ClN$_6$O | 42.11 | 5.10 | 32.74 | 42.45 | 5.06 | 32.86 |
| B-37 | | CH$_3$—N⟨ ⟩N— | Cl | 189-90 | C$_{10}$H$_{16}$ClN$_7$O | 27.59 | 3.71 | | 28.11 | 3.62 | |
| B-38 | A-20 | C$_2$H$_5$N⟨ ⟩N— | Cl | 168-70 | C$_{11}$H$_{18}$ClN$_7$O | 44.07 | 6.05 | | 44.20 | 5.66 | |
| B-39 | A-21 | O⟨ ⟩N— | Cl | 190-92 | C$_9$H$_{13}$ClN$_6$O$_2$ | 39.64 | 4.80 | 30.82 | 39.43 | 4.57 | 30.64 |

| Preparation | Ester from Prepn.[1] | X | Y | Preparation | Ester from Prepn.[1] | X | Y |
|---|---|---|---|---|---|---|---|
| B-40 | | H$_2$N— | Br | B-49 | | ⟨phenyl⟩—CH$_2$CH$_2$NH— | Cl |
| B-41 | | H$_2$N— | I | B-50 | | ⟨O-furyl⟩—CH$_2$NH— | Cl |
| B-42 | | ▷—NH— | Cl | B-51 | A-23 | C$_2$H$_5$N(CH$_2$)$_2$NH—/COCH$_3$ | Cl |
| B-43 | A-4 | CH≡CCH$_2$NH— | Cl | B-52 | A-24 | ⟨piperidinyl⟩N—(CH$_2$)$_2$NH— | Cl |
| B-44 | | ▷—CH$_2$NH— | Cl | B-53 | A-25 | ⟨piperidinyl⟩N—(CH$_2$)$_3$NH— | Cl |
| B-45 | | CH$_3$(CH$_3$O)N— | Cl | B-54 | | Cl—⟨phenyl⟩—NH— | Cl |
| B-46 | | CF$_3$CH$_2$NH— | Cl | B-55 | | CH$_3$\N—/CH$_3$ | DH$_3$ |
| B-47 | | CF$_3$CH$_2$CH$_2$NH— | Cl | B-56 | | CH$_3$\N—/CH$_2$=CH—CH$_2$ | Cl |
| B-48 | | CH$_3$—⟨phenyl⟩—CH$_2$NH— | Cl | B-57 | | CH$_3$\N—/n-C$_4$H$_9$ | Cl |

[1] Ester known unless otherwise noted.

(C) Preparation of 1-(3-amino-5-X-6-Y-pyrazinoyl)-thiosemicarbazides (C-1) Preparation of 1-(3,5-diamino-6-chloropyrazinoyl)thiosemicarbazide.—A mixture of 3,5-diamino-6-chloropyrazinoic acid hydrazide, from preparation (B-4), (6.06 g.; 0.03 mole) and potassium thiocyanate (3.3 g.; 0.034 mole) in glacial acetic acid (120 ml.) is heated on the steam bath for two hours. The reaction mixture is cooled to room temperature and the solid removed by filtration. The solid material is dissolved on hot dimethylformamide (20 ml.) and reprecipitated by addition of water to give 2.19 g. of 1-(3,5-diamin-6-chloropyrazinoyl)thiosemicarbazide, M.P. 241.5–243° C. (dec.). After recrystallization from a mixture of dimethylformamide and water, the material melts at 242.5–244° C. (dec.).

Analysis.—Calculated for $C_6H_8ClN_7OS$ (percent): C, 27.53; H, 3.08; N, 37.47. Found (percent): C, 27.74; H, 2.88; N, 37.61.

(C-2) Preparation of 1[3-amino-5-(2-dimethylaminoethylamino)-6 - chloropyrazinoyl]thiosemicarbazide.—3-amino - 5-(2-dimethylaminoethylamino)-6-chloropyrazinoic acid hydrazide (10.92 g.; 0.04 mole), from preparation (B-22), and potassium thiocyanate (7.76 g.; 0.08 mole), are mixed with N hydrochloric acid (75 ml.) and refluxed for 3 hours. The solution is cooled and allowed to stand overnight. Water (100 ml.) is added and the solid present is collected by filtration. The yellow solid obtained is dissolved in hot water (200 ml.) treated with decolorizing charcoal, filtered and the filtrate made alkaline by addition of 6 N ammonium hydroxide (10 ml.). The yellow solid that precipitates is collected and dried to give 7.38 g. of 1-[3-amino-5-(2-dimethylaminoethylamino)-6-chloropyrazinoyl]thiosemicarbazide, M.P. 201° C. Recrystallization from nitromethane gives material melting at 202–203° C. (dec.).

Analysis.—Calculated for $C_{10}H_{17}ClN_8OS$ (percent): C, 36.08; H, 5.08; N, 33.99. Found (percent): C, 36.43; H, 5.00; N, 33.23.

(C-3) Preparation of 1-(3.5-diamino-6-chloropyrazinoyl)-4-allylthiosemicarbazide.—3,5 - diamino-6-chloropyrazinoic acid hydrazide (6.0 g.; 0.03 mol), from Preparation (B-4), and allyl isothiocyanate (4.95 g.; 0.05 mole) are mixed with glacial acetic acid (120 ml.) and warmed on the steam bath for two hours. The reaction mixture is diluted with water (250 ml.) and chilled in an ice bath. The solid that separates is collected by filtration and dried to give 7.10 g. (79%) of 1-(3,5-diamino-6-chloropyrazinoyl) - 4-allylthiosemicarbazide, M.P. 210–212° C. (dec.). Recrystallization from acetonitrile gives material melting at 213–215° C. (dec.).

Analysis.—Calculated for $C_9H_{12}ClN_7OS$ (percent): C, 35.82; H, 4.01; N, 32.49. Found (percent): C, 35.86; H, 4.35; N, 32.46.

(C-4) Preparation of 1-(3-amino-6-chloropyrazinoyl)-4-allylthiosemicarbazide.—A refluxing solution of 3-amino-6-chlorpyrazinoic acid hydrazide (21.41 g.; 0.15 mole) in 2-methoxy-ethanol (225 ml.) is treated with allyl isothiocyanate (17.85 g.; 0.18 mole) and refluxing is continued for two hours. The reaction mixture then is concentrated to a paste under reduced pressure and the residue is triturated with ethanol to give 26.28 g. (61%) of 1-(3-amino-6-chloropyrazinoyl)-4-allylthiosemicarbazide, M.P. 203–205° C. Recrystallization from acetic acid gives the product in the form of orange prisms, M.P. 208–209° C.

Analysis.— Calculated for $C_9H_{11}ClN OS$ (percent): C, 37.70; H, 3.87; N, 29.31. Found (percent): C, 38.02; H, 3.80; N, 29.37.

(C-5) Preparation of 1-(3-amino-6-chloropyrazinoyl)-thiosemicarbazide.—A solution of 3-amino-6-chloropyrazinoic acid hydrazide (3.8 g.; 0.02 mole) and potassium thiocyanate (2.4 g.; 0.024 mole) in acetic acid (40 ml.) is heated one hour on the steam bath. The crystalline product that separates is collected on a filter and recrystallized from a mixture of isopropyl alcohol and water to give 1.7 g. (68%) of 1-(3-amino-6-chloropyrazinoyl)thiosemicarbazide, M.P. 236–237° C. (dec.).

Analysis.—Calculated for $C_6H_7ClN_6OS$ (percent): C, 29.21; H, 2.86; N, 34.07. Found (percent): C, 29.55; H, 3.03; N, 34.30.

(C-6) Preparation of 1-(3.5-diamino-6-chloropyrazinoyl)-4-phenylthiosemicarbazide.—A mixture of 3,5-diamino-6-chloropyrazinoic acid hydrazide (6.06 g.; 0.03 mole), from Preparation (B-5), and phenyl isothiocyanate (6.0 ml.) in glacial acetic acid (120 ml.) is heated on the steam bath for one hour, cooled and diluted slowly with water (250 ml.) and set aside overnight. The solid that forms is collected and dried to give 6.4 g. (63%) of 1-(3,5-diamino-6-chloropyrazinoyl) - 4 - phenylthiosemicarbazide, M.P., depending upon the rate of heating, 206–208° C. (fast heating); 223–224° C. (slow heating), both with decomposition. Recrystallization from aqueous isopropyl alcohol gives material melting at 207–208° C. (fast heating); 224–226° C. (slow heating), both with decomposition.

Analysis.—Calculated for $C_{12}H_{12}ClN_7OS$ (percent): C, 42.66; H, 3.58. Found (percent): C, 43.14; H, 3.64.

The above reaction when carried out in the presence of pyridine as a solvent gives material identical with that obtained in preparation (C-6).

(C-7) Preparation of 1-{3-amino-5-[2-(2-pyridyl)hydrazino]-6 - chloropyrazinoyl}thiosemicarbazide.—3-amino-5-[2-(2-pyridyl)hydrazino]-6 - chloropyrazinoic acid hydrazide (3.4 g.; 0.0115 mole), from Preparation (B-3), and potassium thiocyanate (2.23 g.; 0.023 mole) are mixed with N hydrochloric acid (75 ml.) and heated to reflux three hours. The resulting clear yellow solution is cooled and allowed to stand overnight. The solid that separates is collected and dried to give 1.70 g. (43%) of 1-{3-amino-5-[2-(2-pyridyl)hydrazino]-6-chloropyrazinoyl}thiosemicarbazide, M.P. 226–229° C. (dec.). Recrystallization from dimethyl-formamide by the addition of acetonitrile gives material melting at 228–231° C. (dec.).

Analysis.—Calculated for $C_{11}H_{12}ClN_9OS$ (percent): C, 37.34; H, 3.42; N, 35.65. Found (percent): C, 37.13; H, 3.35; N, 35.40.

(C-8) Preparation of 1-(3,5-diamino - 6-chloropyrazinoyl)-4-methylthiosemicarbazide.—A mixture of 3,5-diamino-6-chloropyrazinoic acid hydrazide (6.06 g.; 0.03 mole), from preparation (B-4), and methyl isothiocyanate (3.67 g.; 0.05 mole) in glacial acetic acid (120 ml.) is heated on the steam bath for two hours. The reaction mixture is diluted with water (250 ml.) and the resulting solid is collected and dried to give 6.53 g. (79%) of 1-(3,5-diamino - 6-chloropyrazinoyl) - 4-methylthiosemicarbazide, M.P. 270–273° C. (dec.). Recrystallization from hot dimethylformamide gives material melting at 271–273° C. (dec.).

Analysis.—Calculated for $C_7H_{10}ClN_7OS$ (percent): C, 30.49; H, 3.66; N, 35.56. Found (percent): C, 30.70; H, 3.91; N, 35.53.

The above reaction when carried out employing pyridine as the solvent gives the same product.

(C-9) Preparation of 1-[3-amino - 5-(2,2-pentamethylenehydrazino) - 6 - chloropyrazinoyl]thiosemicarbazide.—A solution of 3-amino-5-(2,2-pentamethylenehydrazino)-6-chloropyrazinoic acid hydrazide (5.71 g.; 0.02 mole) from preparation (B-2), and potassium thiocyanate (3.88 g.; 0.04 mole) in N hydrochloric acid (40 ml.) is refluxed for two hours. The clear solution then is diluted with water (100 ml.) and neutralized by the addition of dilute ammonium hydroxide. The solid that separates is collected and dried to give 5.8 g. (85%) of 1-[3 - amino-5 - (2,2-pentamethylenehydrazino) - 6-chloropyrazinoyl]thiosemicarbazide, M.P. 230–233° C. (dec.).

Recrystallization from nitromethane with a little added dimethylformamide gives material melting at 239.5–242.5° C. (dec.).

*Analysis.*—Calculated for $C_{11}H_{17}ClN_8OS$ (percent): C, 38.31; H, 4.97; N, 32.50. Found (percent): C, 38.67; H, 5.12; N, 32.55.

(C–10) Preparation of 1-{3 - amino - 5 - [2-(2-pyridyl) hydrazino] - 6-chloropyrazinoyl} - 4-allyl - 3-thiosemicarbazide.—3-amino - 5-[2-(2 - pyridyl)hydrazino] - 6-chloropyrazinoic acid hydrazide (6.49 g.; 0.022 mole), from preparation (B–4), and allyl isothiocyanate (3.92 g.; 0.044 mole) are mixed with glacial acetic acid (130 ml.), and heated on a steam bath with stirring for two hours. The reaction mixture is diluted with water (500 ml.), and neutralized with dilute aqueous ammonium hydroxide (150 ml.). The yellow solid that separates is collected by filtration and dried, yielding 7.9 g. (91%) of 1-{3 - amino-5 - [2-(2 - pyridyl)hydrazino] - 6-chloropyrazinoyl}-4-allyl-3-thiosemicarbazide, M.P. 218–222° C. Recrystallization from dimethylformamide gives material melting at 226–227° C. (dec.).

*Analysis.*—Calculated for $C_{14}H_{16}ClN_9OS$ (percent): C, 42.69; H, 4.10; N, 32.01. Found (percent): C, 42.55; H, 4.07; N, 31.94.

Additional 1-(3 - amino-5-X-6-Y-pyrazinoyl)thiosemicarbazides prepared by substantially the same procedure described in preparation (C–1) are identified in Table III. The products are prepared by reacting the pyrazinoic acid hydrazide IV with the thiocyanate or isothiocyanate to give the desired product II wherein in each of the reactants and end product X, Y and $R^1$ have the significance given in the table.

TABLE III

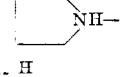

| Preparation | Hydrazide from Prepn. | X | Y | $R^1$ |
|---|---|---|---|---|
| C–11 | | H | Cl | $-CH_2-C_6H_5$ |
| C–12 | B–1 | $(C_2H_5)_2N-$ | Cl | $-CH_2CH=CH_2$ |
| C–13 | B–5 | $CH_3NH-$ | Cl | $-CH_2CH=CH_2$ |
| C–14 | B–6 | $C_2H_5NH-$ | Cl | $-CH_3$ |
| C–15 | B–7 | $n-C_3H_7NH-$ | Cl | $-C_3H_7-n$ |
| C–16 | B–8 | $CH_2=CHCH_2NH-$ | Cl | $-CH_2-CH=CH_2$ |
| C–17 | B–9 | $n-C_4H_9NH-$ | Cl | $-C_4H_9-n$ |
| C–18 | B–10 | 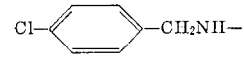 | Cl | $-C_3H_7-n$ |
| C–19 | B–11 | $(CH_3)_3C-NH-$ | Cl | $-CH_2CH=CH_2$ |
| C–20 | B–12 | 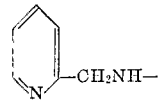 | Cl | $-CH_2CH=CH_2$ |
| C–21 | | H | I | H |
| C–22 | B–14 | $CH_3OCH_2CH_2NH-$ | Cl | $-CH_2CH=CH_2$ |
| C–23 | B–15 | 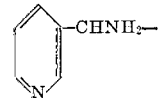 | Cl | $-CH_2CH=CH_2$ |
| C–24 | B–16 | 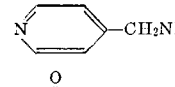 | Cl | $-CH_2CH=CH_2$ |
| C–25 | B–17 | 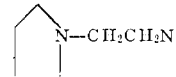 | Cl | $-CH_2CH=CH_2$ |
| C–26 | B–18 | 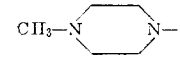 | Cl | $-C_4H_9-n$ |
| C–27 | B–19 | $CH_3\overset{O}{\overset{\|}{C}}-NH(CH_2)_2NH-$ | Cl | $-C_4H_9-n$ |
| C–28 | B–45 | $CH_3(CH_3O)N-$ | Cl | $-CH_2CH=CH_2$ |
| C–29 | B–21 | $CH_3CONH(CH_2)_3NH-$ | Cl | $-CH_2CH=CH_2$ |
| C–30 | B–23 | $(C_2H_5)_2N(CH_2)_2NH-$ | Cl | $-CH_2CH=CH_2$ |
| C–31 | B–57 | $\underset{n-C_4H_9}{\overset{CH_3}{\diagdown}}N-$ | Cl | $-C_4H_9-n$ |
| C–32 | B–25 | $(CH_3)_2N(CH_2)_3NH-$ | Cl | $-CH_2CH=CH_2$ |
| C–33 | B–26 | $(CH_3)_2N(CH_2)_4NH-$ | Cl | $-C_4H_9-n$ |
| C–34 | B–27 | ⟨N⟩$-CH_2CH_2NH-$ | Cl | $-C_6H_5$ |
| C–35 | B–28 | $CH_3-N$⟨ ⟩$N-(CH_2)_3NH-$ | Cl | $-CH_2CH=CH_2$ |

TABLE III—Continued

| Preparation: | Hydrazide from Prepn.[1] | X | Y | R[1] |
|---|---|---|---|---|
| C-36 | B-29 | O(morpholino)N—(CH$_2$)$_3$NH— | Cl | —CH$_2$CH=CH$_2$ |
| C-37 | B-30 | C$_6$H$_5$—NH— | Cl | —C$_6$H$_5$ |
| C-38 | B-31 | (CH$_3$)$_2$N— | Cl | —CH$_2$CH=CH$_2$ |
| C-39 | B-32 | (CH$_3$)(CH$_3$)N— | C$_6$H$_5$— | —CH$_2$CH=CH$_2$ |
| C-40 | B-33 | (CH$_3$)(C$_2$H$_5$)N— | Cl | —CH$_2$CH=CH$_2$ |
| C-41 | B-34 | (CH$_3$)(C$_3$H$_7$)N— | Cl | —CH$_2$CH=CH$_2$ |
| C-42 | B-56 | (CH$_3$)(CH$_2$=CH—CH$_2$)N— | Cl | —CH$_2$CH=CH$_2$ |
| C-43 | B-36 | pyrrolidino-N— | Cl | —CH$_2$CH=CH |
| C-44 | B-37 | CH$_3$—N(piperazino)N— | Cl | —CH$_2$CH=CH$_2$ |
| C-45 | B-38 | C$_2$H$_5$N(piperazino)N— | Cl | —CH$_2$CH=CH$_2$ |
| C-46 | B-39 | O(morpholino)N— | Cl | —CH$_2$CH=CH$_2$ |
| C-47 | B-35 | (CH$_3$)(n-C$_4$H$_9$)N(CH$_2$)$_2$NH— | Cl | —C$_4$H$_6$-n |
| C-48 | B-24 | (CH$_3$)$_2$N(CH$_2$)$_2$N(CH$_3$)— | Cl | —CH$_3$ |
| C-49 | B-20 | (C$_2$H$_5$)$_2$N(CH$_2$)$_2$N(CH$_3$)— | Cl | —CH$_3$ |
| C-50 | B-55 | (CH$_3$)$_2$N— | —CH$_3$ | —CH$_3$ |
| C-51 | B-13 | CH$_3$N(COCH$_3$)—(CH$_2$)$_2$NH— | Cl | —CH$_3$ |
| C-52 | B-40 | H$_2$N— | Br | —CH$_2$CH=CH$_2$ |
| C-53 | B-41 | H$_2$N— | I | —CH$_2$CH=CH$_2$ |
| C-54 | B-42 | cyclopropyl-NH— | Cl | n-C$_3$H$_7$ |
| C-55 | B-43 | CH≡CCH$_2$NH— | Cl | —CH$_2$CH=CH$_2$ |
| C-56 | B-44 | cyclopropyl-CH$_2$NH— | Cl | H |
| C-57 | B-54 | Cl—C$_6$H$_4$—NH— | Cl | —(CH$_2$)$_2$C$_6$H$_5$ |
| C-58 | B-46 | CF$_3$CH$_2$NH— | Cl | —CH$_2$—C$_6$H$_5$ |
| C-59 | B-47 | CF$_3$CH$_2$CH$_2$NH— | Cl | —CH$_2$CH=CH$_2$ |
| C-60 | B-48 | CH$_3$—C$_6$H$_4$—CH$_2$NH— | Cl | —CH$_2$CH=CH$_2$ |
| C-61 | B-49 | C$_6$H$_5$—CH$_2$CH$_2$NH— | Cl | —CH$_2$—C$_6$H$_5$ |

TABLE III—Continued

| Preparation: | Hydrazide from Prepn.[1] | X | Y | R[1] |
|---|---|---|---|---|
| C-62 | B-50 | (furfuryl)–CH₂NH– | Cl | –CH₂CH=CH₂ |
| C-63 | B-51 | C₂H₅N(CH₂)₂NH–<br>\|<br>COCH₃ | Cl | –CH₂CH=CH₂ |
| C-64 | B-52 | (phenyl)N–(CH₂)₂NH– | Cl | –CH₂CH=CH₂ |
| C-65 | B-53 | (phenyl)N–(CH₂)₃NH– | Cl | –CH₂CH=CH₂ |

[1] Hydrazide known unless otherwise noted.

The following examples are illustrative of the methods for making the compounds of this invention from thiosemicarbazides and are not to be considered as limiting the invention to the particular procedural conditions employed or to the particular products prepared thereby.

EXAMPLE 1

1-(3,5-diamino-6-chloropyrazinoyl)-3-methyl-3-thioisosemicarbazide

A solution of 1-(3,5-diamino-6-chloropyrazinoyl)-thiosemicarbazide (6.0 g.; 0.023 mole), from preparation (C–1), in 0.5 N sodium hydroxide solution (65 ml.) is stirred at room temperature while a solution of methyl iodide (4.5 ml.) in ethanol (5 ml.) is added rapidly. The mixture is stirred one-half hour and the precipitated solid is collected by filtration. Recrystallization of the solid material from 50% aqueous ethanol gives 3.68 g. of 1-(3,5-diamino-6-chloropyrazinoyl)-3-methyl - 3 - thioisosemicarbazide in the form of fluffy yellow needles, M.P. >320° C.

Analysis.—Calculated for $C_7H_{10}ClN_7OS$ (percent): C, 30.49; H, 3.66; N, 35.56. Found (percent): C, 30.84; H, 3.65; N, 35.77.

EXAMPLE 2

1-[3-amino-5-(2-dimethylaminoethylamino) - 6 - chloropyrazinoyl]-3-methyl-3-thioisosemicarbazide A solution of 1-[3-amino-5-(2-dimethylaminoethylamino)-6-chloropyrazinoyl]thiosemicarbazide (4.15 g.; 0.0125 mole), from preparation (C–2), in 0.5 N sodium hydroxide solution (50 ml.) is stirred at room temperature while a solution of methyl iodide (1.77 g.; 0.0125 mole) in ethanol (5 ml.) is added. After ½ hour the aqueous solution is extracted with two 50 ml. portions and four 25 ml. portions of ethyl acetate. The combined ethyl acetate fractions are dried over anhydrous magnesium sulfate and evaporated under reduced pressure. The residual yellow solid is recrystallized from ethyl acetate to give 0.50 g. of 1-[3-amino-5-(2-dimethylaminoethylamino)-6-chloropyrazinoyl]-3-methyl - 3 - thioisosemicarbazide, M.P. 178–181° C. (dec.).

Analysis.—Calculated for $C_{11}H_{19}ClN_8OS$ (percent): C, 38.09; H, 5.52; N, 32.31. Found (percent): C, 38.11; H, 5.38; N, 32.46.

EXAMPLE 3

1-(3,5-diamino-6-chloropyrazinoyl)-3-methyl-4-allyl-3-thioisosemicarbozide

A solution of 1-(3,5-diamino-6-chloropyrazinoyl)-4-allyl-3-thiosemicarbazide (6.02 g.; 0.02 mole), from preparation (C–3), in dilute sodium hydroxide (300 ml. of 0.5 N) is stirred at room temperature while a solution of methyl iodide (4 ml.) in ethanol (10 ml.) is added. The mixture is stirred for one hour and the solid that separates is collected and dried to give 4.93 g. (79%) of 1-(3,5-diamino-6-chloropyrazinoyl)-3-methyl - 4-allyl-3-thioisosemicarbazide, M.P. 94–100° C. (dec.). Recrystallization from ethyl acetate followed by recrystallization from benzene gives material melting at 131–133° C.

Analysis.—Calculated for $C_{10}H_{14}ClN_7OS$ (percent): C, 38.03; H, 4.47; N, 31.05. Found (percent): C, 38.35; H, 4.35; N, 30.82.

EXAMPLE 4

1-(3-amino-6-chloropyrazinoyl)-3-ethyl-4-allyl-3-thioisosemicarbazide

By replacing the thiosemicarbazide and the methyl iodide employed in Example 1 by equimolecular quantities of 1-(3-amino-6-chloropyrazinoyl)-4-allylthiosemicarbazide, from preparation (C–4), and ethyl bromide respectively, and following substantially the same procedure described in Example 1 there is obtained 1-(3-amino-6-chloropyrazinoyl)-3-ethyl-4-allyl-3-thioisosemicarbazide.

EXAMPLE 5

1-(3-amino-6-chloropyrazinoyl)-3-isopropyl-3-thioisosemicarbazide

By replacing the thiosemicarbazide and the methyl iodide employed in Example 1 by equimolecular quantities of 1-(3-amino-6-chloropyrazinoyl)thiosemicarbazide, from preparation (C–5), and isopropyl iodide respectively, and following substantially the same procedure described in Example 1, there is obtained 1-(3-amino-6-chloropyrazinoyl)-3-isopropyl-3-thioisosemicarbazide.

EXAMPLE 6

1-(3,5-diamino-6-chloropyrazinoyl)-3-butyl-4-phenyl-3-thioisosemicarbazide

By replacing the thiosemicarbazide and the methyl iodide employed in Example 1 by equimolecular quantities of 1-(3,5-diamino-6-chloropyrazinoyl)-4-phenylthiosemicarbazide (C–6) and butyl bromide respectively, and then following substantially the same procedure described in Example 1, there is obtained 1-(3,5-diamino-6-chloropyrazinoyl)-3-butyl-4-phenyl-3-thioisosemicarbazide.

EXAMPLE 7

1-{3-amino-5-[2-(2-pyridyl)hydrazino]-6-chloropyrazinoyl}-3-benzyl-3-thioisosemicarbazide By replacing the thiosemicarbazide and the methyl iodide employed in Example 1, by equimolecular quantities of 1-{3-amino-5-[2-(2-pyridyl)hydrazino]-6-chloropyrazinoyl}-thiosemicarbazide, from preparation (C–7), and benzyl chloride and following substantially the same procedure described in Example 1, there is obtained 1-{3 - amino-5-[2-(2 - pyridyl)hydrazino]-6-chloropyrazinoyl}-3-benzyl-3-thioisosemicarbazide.

EXAMPLE 8

1-(3,5-diamino-6-chloropyrazinoyl)-3-(p-methylbenzyl)-4-methyl-3-thioisosemicarbazide By replacing the thiosemicarbazide and the methyl iodide employed in Example 1, by equimolecular quantities of 1-(3,5-diamino-6-chloropyrazinoyl)-4-methyl-thiosemicarbazide, from preparation (C-8), and p-methylbenzyl chloride respectively, and following substantially the same procedure described in Example 1, there is obtained 1-(3,5-diamino-6-chloropyrazinoyl)-3-(p-methylbenzyl)-4-methyl-3-thioisosemicarbazide.

EXAMPLE 9

1-(3,5-diamino-6-chloropyrazinoyl)-3-(p-chlorobenzyl)-4-methyl-3-thioisosemicarbazide By replacing the thiosemicarbazide and the methyl iodide employed in Example 1, by an equimolecular quantity of 1-(3,5-diamino-6-chloropyrazinoyl)-4-methyl-thiosemicarbazide, from preparation (C-8), and p-chlorobenzyl chloride respectively, and following substantially the same procedure described in Example 1, there is obtained 1-(3,5-diamino-6-chloropyrazinoyl)-3-(p-chlorobenzyl)-4-methyl-3-thioisosemicarbazide.

EXAMPLE 10

1-{3-amino-5-(2,2-pentamethylenehydrazino)-6-chloropyrazinoyl}-3-phenethyl-3-thioisosemicarbazide By replacing the thiosemicarbazide and methyl iodide employed in Example 1, by equimolecular quantities of 1-[3-amino-5-(2,2-pentamethylenehydrazino)-6-chloropyrazinoyl]-thiosemicarbazide, from preparation (C-9), and phenethyl bromide respectively, and then following substantially the same procedure described in Example 1, there is obtained 1-[3-amino-5(2,2-pentamethylenehydrazino)-6-chloropyrazinoyl] - 3-phenethyl-3 - thioisosemicarbazide.

Additional 1 - (3 - aminopyrazinoyl)-3-substituted-3-thioisosemicarbazide products prepared by the procedures described in Examples 1 through 10 are identified in Table IV. The products are prepared by reacting the (3-aminopyrazinoyl)thiosemicarbazide (II) with the alkylating agent (III) to give the desired product I wherein X, Y, R and $R^1$ have the significance given in the table.

TABLE IV

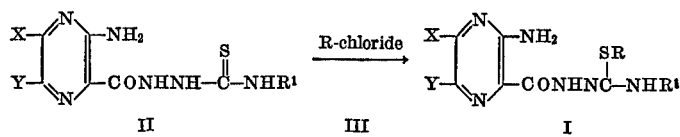

| Example: | Thiosemicarbazide from Prepn. | X | Y | $R^1$ | R |
|---|---|---|---|---|---|
| 11 | C-10 | ⟨pyridinyl⟩-NHNH— | Cl | —CH$_2$CH=CH$_2$ | —CH$_3$ |
| 12 | C-12 | (C$_2$H$_5$)$_2$N— | Cl | —CH$_2$CH=CH$_2$ | —CH$_3$ |
| 13 | C-13 | CH$_3$NH— | Cl | —CH$_2$CH=CH$_2$ | —CH$_3$ |
| 14 | C-14 | C$_2$H$_5$NH— | Cl | —CH$_3$ | —CH$_3$ |
| 15 | C-15 | n-C$_3$H$_7$NH— | Cl | —C$_3$H$_7$-n | —C$_3$H$_7$-n |
| 16 | C-16 | CH$_2$=CHCH$_2$NH— | Cl | —CH$_2$CH=CH$_2$ | —CH$_3$ |
| 17 | C-17 | n-C$_4$H$_9$NH— | Cl | —C$_4$H$_9$-n | —C$_4$H$_9$-n |
| 18 | C-18 | (CH$_3$)$_2$CHNH— | Cl | —C$_3$H$_7$-n | —C$_3$H$_7$-n |
| 19 | C-19 | (CH$_3$)$_3$C—NH— | Cl | —CH$_2$CH=CH$_2$ | —CH$_3$ |
| 20 | C-20 | ⟨cyclopentyl⟩-NH— | Cl | —CH$_2$CH=CH$_2$ | —CH$_2$—C$_6$H$_5$ |
| 21 | C-11 | H | Cl | —CH$_2$—C$_6$H$_5$ | —(CH$_2$)$_2$—C$_6$H$_5$ |
| 22 | C-22 | CH$_3$OCH$_2$CH$_2$NH— | Cl | —CH$_2$CH=CH$_2$ | —CH$_2$—C$_6$H$_5$ |
| 23 | C-23 | Cl—⟨C$_6$H$_4$⟩—CH$_2$NH— | Cl | —CH$_2$CH=CH$_2$ | —C$_2$H$_5$ |
| 24 | C-24 | ⟨pyridyl⟩-CH$_2$NH— | Cl | —CH$_2$CH=CH$_2$ | —CH$_3$ |
| 25 | C-25 | ⟨pyridyl⟩-CH$_2$NH— | Cl | —CH$_2$CH=CH$_2$ | —CH$_3$ |
| 26 | C-26 | ⟨pyridyl⟩-CH$_2$NH— | Cl | C$_4$H$_9$-n | —C$_4$H$_9$-n |
| 27 | C-27 | CH$_3$C(O)—NH(CH$_2$)$_2$NH— | Cl | —C$_4$H$_9$-n | —C$_4$H$_9$-n |
| 28 | C-21 | H | I | H | —CH$_2$—⟨C$_6$H$_4$⟩—CH$_3$ |

TABLE IV—Continued

| Example | Thiosemi-carbazide from Prepn. | X | Y | R¹ | R |
|---|---|---|---|---|---|
| 29 | C-29 | $CH_2CONH(CH_2)_3NH-$ | Cl | $-CH_2CH=CH_2$ | $-C_3H_7-i$ |
| 30 | C-30 | $(C_2H_5)_2N(CH_2)_2NH-$ | Cl | $-CH_2CH=CH_2$ | $-CH_3$ |
| 31 | C-28 | $CH_3(CH_3O)N-$ | Cl | $-CH_2CH=CH_2$ | $-C_3H_7-n$ |
| 32 | C-32 | $(CH_3)_3N(CH_2)_3NH-$ | Cl | $-CH_2CH=CH_2$ | $-C_3H_7-n$ |
| 33 | C-33 | $(CH_3)_2N(CH_2)_4NH-$ | Cl | $C_4H_9-n$ | $-C_4H_9-n$ |
| 34 | C-34 | $N-CH_2CH_2NH-$ | Cl | $-C_6H_5$ | $-CH_2-C_6H_5$ |
| 35 | C-35 | $CH_3-N$$N-(CH_2)_3NH-$ | Cl | $-CH_2CH=CH_2$ | $-(CH_2)_2-C_6H_5$ |
| 36 | C-36 | $O$$N-(CH_2)_3NH-$ | Cl | $-CH_2CH=CH_2$ | $-CH_3$ |
| 37 | C-37 | $-NH-$ | Cl | $-C_6H_5$ | $-CH_3$ |
| 38 | C-38 | $(CH_3)_2N-$ | Cl | $-CH_2CH=CH_2$ | $-H_2C-C_6H_5$ |
| 39 | C-39 | $CH_3$<br>$N-$<br>$CH_3$ |  | $-CH_2CH=CH_2$ | $-CH_3$ |
| 40 | C-40 | $CH_3$<br>$N-$<br>$C_2H_5$ | Cl | $-CH_2CH=CH_2$ | $-CH_3$ |
| 41 | C-41 | $CH_3$<br>$N-$<br>$C_3H_7$ | Cl | $-CH_2CH=CH_2$ | $-C_3H_7-i$ |
| 42 | C-31 | $CH_3$<br>$N-$<br>$n-C_4H_9$ | Cl | $-C_4H_9-n$ | $-CH_2-$$-Cl$ |
| 43 | C-43 | $N-$ | Cl | $-CH_2CH=CH_2$ | $-CH_3$ |
| 44 | C-44 | $CH_3-N$$N-$ | Cl | $-CH_2CH=CH_2$ | $-CH_3$ |
| 45 | C-45 | $C_2H_5N$$N-$ | Cl | $-CH_2CH=CH_2$ | $-CH_3$ |
| 46 | C-46 | $O$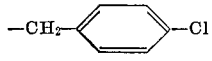$N-$ | Cl | $-CH_2CH=CH_2$ | $-CH_3$ |
| 47 | C-47 | $CH_3$<br>$N(CH_2)_2NH-$<br>$n-C_4H_9$ | Cl | $C_4H_9-n$ | $-C_2H_5$ |
| 48 | C-48 | $(CH_3)_2N(CH_2)_3N-$<br>$CH_3$ | Cl | $-CH_3$ | $-H_2C-$$-Cl$ |
| 49 | C-49 | $(C_2H_5)_2N(CH_2)_2N-$<br>$CH_3$ | Cl | $-CH_3$ | $-CH_2-$$-CH_3$ |
| 50 | C-42 | $CH_3$<br>$N-$<br>$CH_2=CH-CH_2$ | Cl | $-CH_2CH=CH_2$ | $-CH_3$ |
| 51 | C-51 | $COCH_3$<br>$CH_3N-(CH_2)_2NH-$ | Cl | $-CH_2CH=CH_2$ | $-CH_3$ |
| 52 | C-52 | $H_2N-$ | Br | $-CH_2CH=CH_2$ | $-CH_3$ |
| 53 | C-53 | $H_2N-$ | I | $-CH_2CH=CH_2$ | $-CH_3$ |

TABLE IV—Continued

| Example | Thiosemicarbazide from Prepn. | X | Y | R¹ | R |
|---|---|---|---|---|---|
| 54 | C-54 | (cyclopropyl)NH— | Cl | —C$_3$H$_7$-n | —CH$_2$—C$_6$H$_5$ |
| 55 | C-55 | CH≡CCH$_2$NH— | Cl | —CH$_2$CH=CH$_2$ | —CH$_2$ |
| 56 | C-56 | (cyclopropyl)-CH$_2$NH— | Cl | H | —CH$_2$—C$_6$H$_5$ |
| 57 | C-50 | (CH$_3$)$_2$N— | CH$_3$ | —CH$_3$ | —CH$_2$—C$_6$H$_4$—CH$_3$ |
| 58 | C-58 | CF$_3$CH$_2$NH— | Cl | —H$_2$C—C$_6$H$_5$ | —CH$_3$ |
| 59 | C-59 | CF$_3$CH$_2$CH$_2$NH— | Cl | —CH$_2$CH=CH$_2$ | C$_3$H$_7$-n |
| 60 | C-60 | CH$_3$—C$_6$H$_4$—CH$_2$NH— | Cl | —CH$_2$CH=CH$_2$ | —C$_4$H$_9$-n |
| 61 | C-61 | C$_6$H$_5$—CH$_2$CH$_2$NH— | Cl | —H$_2$C—C$_6$H$_5$ | —CH$_2$—C$_6$H$_4$—Cl |
| 62 | C-62 | (furyl)-CH$_2$NH— | Cl | —CH$_2$CH=CH$_2$ | —CH$_3$ |
| 63 | C-63 | C$_2$H$_5$N(CH$_2$)$_2$NH— with COCH$_3$ | Cl | —CH$_2$CH=CH$_2$ | —CH$_3$ |
| 64 | C-64 | (piperidinyl)N—(CH$_2$)$_2$NH— | Cl | —CH$_2$CH=CH$_2$ | —CH$_3$ |
| 65 | C-65 | (piperidinyl)N—(CH$_2$)$_3$NH— | Cl | —CH$_2$CH=CH$_2$ | —CH$_3$ |
| 66 | C-57 | Cl—C$_6$H$_4$—NH— | Cl | —(CH$_2$)$_2$—C$_6$H$_5$ | —(CH$_2$)$_2$—C$_6$H$_5$ |

The preparation of the novel (3 - amino-5-X-6-Y-pyrazinoyl)-thiosemicarbazides by the second method, i.e., through the acrylamides, is described in the following preparation and examples.

PREPARATION OF PYRAZINOIC ACIDS (D-1) Preparation of 3,5-diamino-6-chloropyrazinoic acid A mixture of finely ground methyl 3,5-diamino-6-chloropyrazinoate (101.31 g.; 0.50 mole), isopropyl alcohol (1875 ml.) and 5% aqueous sodium hydroxide solution (625 ml.) is heated under reflux, with vigorous stirring, for one hour. Water (7500 ml.) is added to the cooled reaction mixture and the resulting clear solution is made acid to Congo red paper by the addition of concentrated hydrochloric acid. The light yellow solid which separates is collected and dried, yield 92.8 g. (94.4%), M.P. 230–1° C. (dec.). Recrystallization from dimethyl sulfoxide-water gives 3,5-diamino - 6 - chloropyrazinoic acid, M.P. 272° C. dec.

*Analysis.*—Calculated for C$_5$H$_5$ClN$_4$O$_2$ (percent): C, 31.84; H, 2.67; N, 29.71. Found (percent): C, 32.10; H, 2.65; N, 29.57.

(D-2) Preparation of 3-amino-5-(2-propynylamino)-6-chloropyrazinoic acid

Utilizing the procedure substantially as described in preparation (D-1), but substituting for the methyl 3,5-diamino-6-chloropyrazinoate employed therein, an equimolar amount of methyl 3-amino-5-(2-propynylamino)-6-chloropyrazinoate, from preparation (A-4), there is produced 3-amino-5-(2-propynylamino) - 6-chloropyrazinoic acid.

(D-3) Preparation of 3-amino-5-ethylamino-6-chloropyrazinoic acid

A mixture of methyl 3-amino-5-ethylamino-6-chloropyrazinoate (20.0 g.; 0.087 mole) and 5% aqueous sodium hydroxide solution (200 ml.) is heated on a steam bath for two and one-half hours. The resulting solution is acidified with 6 N hydrochloric acid (35 ml.) The light tan colored solid which separates is collected and dried, yielding 15.0 g. (80%), of 3 - amino - 5 - ethylamino-6-chloropyrazinoic acid, M.P. 150–154° C. (dec.).

(D-4) Preparation of 3-amino-5-dimethylamino-6-chloropyrazinoic acid

A mixture of methyl 3-amino - 5 - dimethylamino-6-chloropyrazinoate (20.0 g.; 0.087 mole), from preparation (A-1), and 5% aqueous sodium hydroxide solution (200 ml.) is heated on a steam bath for one hour. The resulting solution is acidified with 6 N hydrochloric acid (50 ml.). The yellow solid which separates is collected and dried, yield 16.6 g. (88%), M.P. 118–120° C. (dec.). Recrystallization from butyl chloride gives 3-amino-5-dimethylamino-6-chloropyrazinoic acid, M.P. 141–142° C. (dec.).

*Analysis.*—Calculated for C$_7$H$_9$ClN$_4$O$_2$ (percent): C, 38.81; H, 4.19; N, 25.86. Found (percent): C, 38.92; H, 4.27; N, 25.89.

(D-5) Preparation of 3-amino-5-(2-dimethylaminoethylamino)-6-chloropyrazinoic acid A solution of methyl 3-amino-5 - (2-dimethylaminoethylamino)-6-chloropyrazinoate (2.74 g.; 0.01 mole) and potassium hydroxide (1.20 g.; 0.02 mole) in methanol (25 ml.) is refluxed for six hours and the methanol is removed under reduced pressure. The residue is dissolved in water (20 ml.) and neutralized by the addition of dilute hydrochloric acid. The solid that precipitates is collected and dried to give 2.42 g. of 3-amino-5-(2-dimethylaminoethylamino) - 6-chloropyrazine acid, M.P. 217–219° C. (dec.).

*Analysis.*—Calculated for $C_9H_{14}ClN_5O_2$ (percent): C, 41.62; H, 5.43. Found (percent): C, 42.14; H, 5.62.

Employing the procedure substantially as described in preparation (D–1) but substituting for the methyl 3,5-diamino-6-chloropyrazinoate an equivalent amount of the methyl or other lower alkyl 3-amino-5-X-6-Y-pyrazinoate identified in the following table, there are produced the 3-amino-5-X-6-Y - pyrazinoic acids, also identified in Table V.

TABLE V

| Preparation: | X | Y |
|---|---|---|
| D-6 | H₂N— | I |
| D-7 | H₂N— | Br |
| D-8 | CH₃—NH— | Cl |
| D-9 | CH₂=CH—CH₂—NH— | Cl |
| D-10 |  | Cl |
| D-11 |  | Cl |
| D-12 | HOCH₂CH₂—NH— | Cl |
| D-13 | HOCH₂—(CHOH)₄—CH₂—NH* | Cl |
| D-14 | CF₃CH₂—NH— | Cl |
| D-15 |  | Cl |
| D-16 |  | Cl |
| D-17 |  | Cl |
| D-18 |  | Cl |
| D-19 | Cl—〈 〉—NH— | Cl |
| D-20 | CH₃O—(CH₃)—N— | Cl |
| D-21 | NH₂—(CH₃)—N— | Cl |
| D-22 |  | Cl |

*Derived from D-glucamine.

PREPARATION OF THE 3-(3-AMINO-5-X-6-Y-PYRAZINOYL)ACRYLAMIDES (E–1) Preparation of N-(t-butyl)-3-methyl-3-(3,5-diamino-6-chloropyrazinoyloxy)acrylamide A mixture of 3,5-diamino-6-chloropyrazinoic acid (1.80 g.; 0.01 mole), from preparation (D–1), and triethylamine (1.0 g.; 0.01 mole) in dimethylformamide (20 ml.) is stirred for ten minutes. N-(t-butyl)-methylisoxazolium perchlorate (2.40 g.; 0.01 mole) is added and the resulting solution stirred two hours. Water (100 ml.) is added and the solid that separates is collected and dried to give 2.85 g. (87%) of N-(t-butyl)-3-methyl-3-(3,5-diamino-6-chloropyrazinoyloxy)acrylamide, M.P. 171–176° C. Recrystallization from acetonitrile gives the product in the form of light yellow crystals, M.P. 187–189° C.

*Analysis.*—Calculated for $C_{13}H_{18}ClN_5O_3$ (percent): C, 47.63; H, 5.53; N, 21.37. Found (percent): C, 47.87; H, 5.55; N, 21.42.

(E–2) Preparation of N-(t-butyl)-3-methyl-3-(3-amino-5-ethylamino-6-chloropyrazinecarbonyloxy)acrylamide A mixture of 3-amino - 5 - ethylamino - 6 - chloropyrazinoic acid (2.17 g.; 0.01 mole), from preparation (D–3), and triethylamine (1.0 g.; 0.01 mole) in dimethylformamide (20 ml.) is stirred for ten minutes. N-(t-butyl)-5-methylisoazolium perchlorate (2.40 g.; 0.01 mole) is added and the resulting solution is stirred for three hours. Water (100 ml.) is added and the solid which separates is collected and dried, yield 2.9 g. (80%) of N-(t-butyl) - 3 - methyl-3-(3-amino-5-ethylamino-6-chloropyrazinecarbonyloxy)acrylamide, M.P. 136–140° C.

(E–3) Preparation of N-(t-butyl) - 3 - methyl - 3 - (3-amino - 5 - dimethylamino-6-chloropyrazinecarbonyloxy(acrylamide A mixture of 3-amino - 5 - dimethylamino - 6 - chloropyrazinoic acid (2.2 g.; 0.01 mole), from preparation (D–4), and triethylamine (1.0 g.; 0.01 mole) in acetonitrile (60 ml.) is stirred for ten minutes. N-(t-butyl-5-methylisoazolium perchlorate (2.4 g.; 0.01 mole) is added and the resulting mixture is stirred for three hours. The acetonitrile is evaporated under reduced pressure, the residue washed with several portions of water and dried, yield 3.5 g. (98%) of N-(t-butyl) - 3 - methyl-3-(3-amino - 5 - dimethylamino-6-chloropyrazinecarbonyloxy)acrylamide, M.P. 150°–153° C. (dec.). Recrystallization from butyl chloride gives material melting at 154–155° C. (dec.).

*Analysis.*—Calculated for $C_{15}H_{22}ClN_5O_3$ (percent): C, 50.63; H, 6.23; N, 19.68. Found (percent): C, 50.37; H, 6.25; N, 19.70.

(E–4) Preparation of N-(t-butyl) - 3 - methyl - 3 - [3-amino - 5 - (2 - dimethylaminoethylamino)-6-chloropyrazinoyloxy]acrylamide 3-amino - 5 - (2 - dimethylaminoethylamino)-6-chloropyrazinoic acid (2.60 g.; 0.01 mole), from preparation (D–5), and triethylamine (7.5 ml.) are mixed in dimethylformamide (75 ml.). N-(t-butyl)-5-methylisoxazolium perchlorate (2.40 g.; 0.01 mole) is added and the solution is stirred for three hours. The reaction mixture is diluted with water (75 ml.) and the aqueous solution is extracted three times with ethyl acetate (75 ml.). The ethyl acetate extracts are dried over anhydrous magnesium sulfate and then evaporated under reduced pressure. The residue is diluted with water (100 ml.) and the solid that forms is collected and dried at 60° C., yield 1.27 g. of N - (t - butyl) - 3 - methyl - 3 - [3-amino-5-(2-dimethylaminoethylamino) - 6 - chloropyrazinoyloxy]acrylamide, M.P. 125–130° C. Recrystallization from acetonitrile gives material with M.P. 130–133° C. Drying of this material at 80° C. under vacuum gives material with M.P. 153–155° C.

*Analysis.*—Calculated for $C_{17}H_{27}ClN_6O_3$ (percent): C, 51.18; H, 6.82; N, 21.07. Found (percent): C, 51.01; H, 6.76; N, 20.86.

(E–5) Preparation of N-(t-butyl)-3-methyl-3-(3-amino-6-chloropyrazinoyloxy)acrylamide A mixture of 3-amino-6-chloropyrazinoic acid (9.2 g.; 0.0526 mole), triethylamine (7.4 ml.) and acetonitrile (100 ml.) is stirred until complete solution is obtained. N-(t-butyl)-5-methylisoxazolium perchlorate (12.6 g.; 0.0526 mole) is added and the solution is stirred at room temperature for two hours. Water (500 ml.) is added and the solid that separates is collected and recrystallized from butyl chloride to give 12.2 g. of N-(t-butyl)-3-methyl-3-(3-amino - 6 - chloropyrazinoyloxy)acrylamide, M.P. 144–146° C.

*Analysis.*—Calculated for $C_{13}H_{17}ClN_4O_3$ (percent): C, 49.92; H, 5.48; N, 17.91. Found (percent): C, 50.21; H, 5.67; N, 17.51.

(E–6) Preparation of N-(t-butyl)-3-methyl-3-(3-aminopyrazinoyloxy)acrylamide 3-aminopyrazinoic acid (6.95 g.; 0.05 mole) is mixed with acetonitrile (100 ml.) and dissolved by the addition of triethylamine (7.0 ml.; 0.05 mole). N-(t-butyl)-5-methylisoxazolium perchlorate (12.0 g.; 0.05 mole) is added and the solution is stirred at room temperature for four hours. The solvent is removed under reduced pressure and water (50 ml.) is added to the residue. The solid that separates is collected and dried to give 11.45 g. of N-(t-butyl) - 3 - methyl-3-(3-aminopyrazinoyloxy) acrylamide, M.P. 113–120° C. Recrystallization from methylcyclohexane gives material with M.P. 122–126° C.

Employing the procedure substantially as described in preparation (E–1) but substituting for the 3,5-diamino-6-chloropyrazinoic acid and the N-(t-butyl) - 5 - methylisoxazolium perchlorate utilized therein, equivalent amounts of 3-amino-5-X-6-Y-pyrazinoic acid and N-$R^4$-5-$R^2$-4-$R^3$-isoxazolium salt respectively which are identified in Table VI, there are produced the N-$R^4$-2-$R^3$-3-$R^2$-3 - (3 - amino-5-X-6-Y-pyrazinoyloxy)acrylamides, also identified in Table VI.

TABLE VI

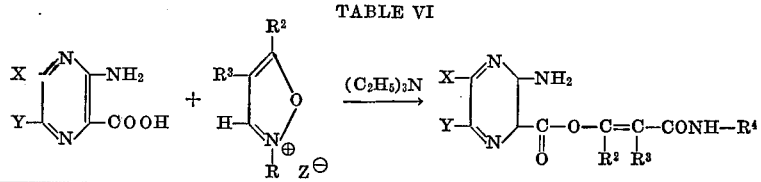

| Preparation: | Acid from Preparation | X | Y | $R^2$ | $R^3$ | $R^4$ | $Z^\ominus$ |
|---|---|---|---|---|---|---|---|
| E–7 | D–2 | HC≡C—CH₂—NH— | Cl | CH₃— | H | (CH₃)₃C— | $ClO_4^\ominus$ |
| E–8 | D–6 | H₂N— | I | $^\ominus O_3S$—⌬— | H | CH₃CH₂— | (a) |
| E–9 | D–7 | H₂N— | Br | ⌬— | H | (CH₃)₃C— | $ClO_4^\ominus$ |
| E–10 | D–8 | CH₃NH— | Cl | CH₃— | H | (CH₃)₃C— | $ClO^\ominus$ |
| E–11 | D–9 | CH₂=CH—CH₂—NH— | Cl | —CH=CH—CH=CH—b | CH₃— | O₂N—⌬—SO₃$^\ominus$ (NO₂) | |
| E–12 | D–10 | ⌬N—NH— | Cl | CH₃— | H | (CH₃)₃C— | $ClO_4^\ominus$ |
| E–13 | D–11 | ▷—CH₂—NH— | Cl | $^\ominus O_3S$—⌬— | H | CH₃CH₂— | (a) |
| E–14 | D–12 | HOCH₂CH₂—NH— | Cl | CH₃— | H | (CH₃)₃C— | $ClO_4^\ominus$ |
| E–15 | D–13 | HOCH₂(CHOH)₄CH₂—NH— | Cl | —CH=CH—CH=CH—b | CH₃— | ON—⌬—SO₃$^\ominus$ (NO₂) | |
| E–16 | D–14 | CF₃CH₂—NH— | Cl | ⌬— | H | (CH₃)₃C— | $ClO_4^\ominus$ |
| E–17 | D–15 | ⌬—CH₂—NH— | Cl | CH₃— | H | (CH₃)₃C— | $ClO_4^\ominus$ |
| E–18 | D–16 | F-⌬—CH₂—NH— | Cl | $^\ominus O_3S$—⌬— | H | CH₃CH₂— | (a) |
| E–19 | D–17 | ⌬(O)—CH₂—NH— | Cl | CH₃— | H | (CH₃)₃C— | $ClO_4^\ominus$ |
| E–20 | D–18 | ⌬—NH— | Cl | CH₃— | H | (CH₃)₃C— | $ClO_4^\ominus$ |
| E–21 | D–19 | Cl—⌬—NH— | Cl | —CH=CH—CH=CH—b | CH₃— | O₂N—⌬—SO₃$^\ominus$ (NO₂) | |
| E–22 | D–20 | CH₃O—(CH₃)—N— | Cl | ⌬— | H | (CH₃)₃C— | $ClO_4^\ominus$ |
| E–23 | D–21 | NH₂—(CH₃)—N— | Cl | CH₃— | H | (CH₃)₃C— | $ClO_4^\ominus$ |
| E–24 | D–22 | ⌬N— | Cl | CH₃— | H | (CH₃)₃C— | $ClO_4^\ominus$ | a The anion appears as part of the $R^2$ substituent; the product appears as the triethyl ammonium salt.
b This compound is not strictly an acrylamide but rather N-$R^4$-2-(3-amino-5-N$R^5R^6$-6-halopyrazinoyloxy)benzamide.

The following examples are illustrative of the methods for making the compounds of this invention from the acrylamides and are not to be considered as limiting the invention to the particular procedural conditions employed or the particular products prepared thereby:

EXAMPLE 67

1-(3,5-diamino-6-chloropyrazinoyl)-3-methyl-3-thioisosemicarbazide

Sodium (0.46 g.; 0.02 mole) is dissolved in refluxing isopropyl alcohol (100 ml.). 3-methyl-3-thioisosemicarbazide hydriodide (5.11 g.; 0.022 mole) is added and the solution is refluxed for 5 minutes followed by the addition of N - (t-butyl)-3-methyl-3(3,5-diamino-6-chloropyrazinoyloxy)acrylamide (3.27 g.; 0.01 mole) (E–1). This mixture is refluxed for two hours then chilled in an ice bath. The solid that forms is collected, washed with water and dried to give 0.30 g. of 1-(3,5-diamino-6-chloropyrazinoyl) - 3 - methyl-3-thioisosemicarbazide, M.P. > 300° C. Recrystallization from 50% aqueous ethanol furnishes the product as light fluffy needles, M.P. > 300° C.

Employing substantially the same procedure described in Example 67, but replacing the acrylamide and the thiosemicarbazide by equivalent amounts of the acrylamides and thiosemicarbazides identified in the following table, there are obtained the 1-(3-amino-5-X-6-Y-pyrazinoyl)-thioisosemicarbazides also identified in Table VII.

TABLE VII

| Example | Acrylamide from Preparation | X | Y | $R^2$ | $R^3$ | $R^4$ | $X^\ominus$ | $R^1$ | R |
|---|---|---|---|---|---|---|---|---|---|
| 68 | E-2 | $C_2H_5NH-$ | Cl | $CH_3-$ | H | $(CH_3)_3C-$ | $ClO_4^\ominus$ | $CH_3-$ | $CH_3-$ |
| 69 | E-3 | $(CH_3)_2N-$ | Cl | Same as above | H | Same as above | Same as above | ⟨phenyl⟩CH– | Same as above |
| 70 | E-4 | $(CH_3)_2N-CH_2CH_2-NH-$ | Cl | do | H | do | do | H | Do. |
| 71 | E-5 | H | Cl | do | H | do | do | $CH_3-$ | Do. |
| 72 | E-6 | H | H | do | H | do | do | Cl–⟨phenyl⟩ | ⟨phenyl⟩CH_2– |
| 73 | E-7 | $HC\equiv CH_2-NH-$ | Cl | do | H | do | do | $CH_3-$ | $CH_3-$ |
| 74 | E-8 | $H_2N-$ | I | $\ominus O_3S$–⟨phenyl⟩ | H | $CH_3CH_2-$ | (a) | Same as above | Same as above |
| 75 | E-9 | $H_2N-$ | Br | ⟨phenyl⟩ | H | $(CH_3)_3C-$ | $ClO_4^\ominus$ | $CH_3-$ | Do. |
| 76 | E-10 | $CH_3-NH-$ | Cl | $CH_3-$ | H | Same as above | Same as above | Cl–⟨phenyl⟩ | ⟨phenyl⟩CH_2– |
| 77 | E-11 | $CH_3=CH-CH_2-NH-$ | Cl | $-CH=CH-CH=CH-$ | (b) | $CH_3-$ | $O_2N$–⟨phenyl(NO_2,SO_3^\ominus)⟩ | $CH_3-$ | $CH_3-$ |

TABLE VII—Continued

| Example | Acrylamide from Preparation | X | Y | R² | R³ | R⁴ | X⁻ | R¹ | R |
|---|---|---|---|---|---|---|---|---|---|
| 78 | E-12 | cyclopentyl-NH— | Cl | CH₃— | H | (CH₃)₃C— | ClO₄⁻ | 4-Cl-C₆H₄— | C₆H₅CH₂— |
| 79 | E-13 | cyclopropyl-CH₂-NH— | Cl | ⁻O₃S-C₆H₄— | H | CH₃CH₂— | (a) | 4-Cl-C₆H₄— | C₆H₅CH₂— |
| 80 | E-14 | HOCH₂CH₂-NH— | Cl | CH₃— | H | (CH₃)₃C— | ClO₄⁻ | C₆H₅— | Same. |
| 81 | E-15 | HOCH₂(CHOH)₄CH₂-NH— | Cl | —CH=CH-CH=CH— | b | CH₃— | Same | Same | Do. |
| 82 | E-16 | CF₃CH₂-NH— | Cl | CH₃— | H | (CH₃)₃C— | O₂N-C₆H₃(NO₂)-SO₃⁻ | ---do--- | C₂H₅— |
| 83 | E-17 | C₆H₅-CH₂-NH— | Cl | CH₃— | H | Same | ClO₄⁻ | ---do--- | Same. |
| 84 | E-18 | 2-F-C₆H₄-CH₂-NH— | Cl | ⁻O₃S-C₆H₄(3-CH₃)— | H | CH₃CH₂— | Same | 4-Cl-C₆H₄— | C₆H₅CH₂— |
| 85 | E-19 | furfuryl-CH₂-NH— | Cl | CH₃— | H | (CH₃)₃C— | (a) | 4-CH₃-C₆H₄— | CH₃— |
| 86 | E-20 | C₆H₅-NH— | Cl | CH₃— | H | Same | Same | 4-Cl-C₆H₄— | C₂H₅— |
| 87 | E-21 | 4-Cl-C₆H₄-NH— | Cl | —CH=CH-CH=CH— | b | CH₃— | O₂N-C₆H₃(NO₂)-SO₃⁻ | 4-Cl-C₆H₄— | C₆H₅CH₂— |
| 88 | E-22 | CH₃O-CH₃-N— | Cl | CH₃— | H | (CH₃)₃C— | ClO₄⁻ | 4-CH₃-C₆H₄— | Same. |
| 89 | E-23 | NH₂-CH₃-N— | Cl | CH₃— | H | Same | Same | (C₆H₅)₂CH— | CH₃— |
| 90 | E-24 | pyrrolidinyl-N— | Cl | CH₃— | H | ---do--- | ---do--- | H | Same. |

ᵃ The anion appears as part of the R² substituent; this reactant appears as the triethyl ammonium salt.
ᵇ This reactant is not strictly an acrylamide but rather N-R⁴-2-(3-amino-5-NR⁵R⁶-4,6-halopyrazinoyloxy)benzamide.

The novel compounds of this invention can be formulated in the usual oral or parenteral dosage forms for use in therapy in the treatment of conditions resulting from an abnormal electrolyte excretion pattern of an animal organism. It will be appreciated that the dosage of each individual compound will vary over a wide range depending upon the relative potency of the selected compound and also depending upon the age and weight of the particular patient to be treated and upon the particular ailment to be treated. For these reasons, tablets, pills, capsules and the like containing for example from 5 to 500 mgs. or more or less active ingredient can be made available for the symptomatic adjustment of the dosage to the individual patient. As each of the compounds of this invention can be incorporated in a dosage form similar to those described in the following examples, or other usual dosage forms suitable for oral or parenteral administration, which can be prepared by well-known methods, the following examples are included herein to illustrate the preparation of representative dosage forms.

EXAMPLE 91

Dry filled capsule containing 500 mgs. of
1-(3,5-diamino-6-chloropyrazinoyl)-
3-methyl-3-thioisosemicarbazide

| | mgs./capsule |
|---|---|
| Active ingredient | 500 |
| Magnesium stearate | 5 |
| Mixed powders | 505 |

Mix the active ingredient with the magnesium stearate and reduce to a No. 60 mesh powder. Encapsulate, filling 505 mgs. in each number 0 capsule.

It is also contemplated to combine compounds of this invention in unit dosage form with other known diuretic agents, such as hydrochlorothiazide, 4'-methyl-6-chlorospiro - [2H-1,2,4-benzothiadiazine-1'-cyclohexane] - 7-sulfonamide-1,1-dioxide, trichloromethiazide, cyclopenthiazide, acetazolamide, dichlorophenamide, chlorthalidone, chlormerodrin, chlorazanil, spironolacetone, and the like or to combine the compounds of this invention with hypotensive agents or steroids or other desired therapeutic agents in suitable dosage form.

While the above examples describe the preparation of certain compounds which are illustrative of the novel compounds of this invention and certain specific dosage forms suitable for administering the novel compounds, as well as certin methods for preparing the novel compounds, it is to be understood that the invention is not to be limited to the specific compounds described in the Examples or by the specific reaction conditions provided in the Examples for their preparation or by the specific ingredients included in the pharmaceutical preparations, but is to be understood to embrace variation and modification thereof which fall within the scope of the appended claims.

What is claimed is:

1. A proces for the preparation of a 1-(3-aminopyrazinol)-3-substituted-3 - thioisosemicarbazide having the structure:

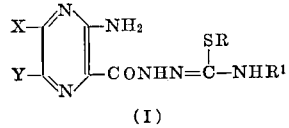

(I)

characterized in that a 1-(3-aminopyrazinoyl)thiosemicarbazide of structure II is caused to react with an alkylating agent of structure III

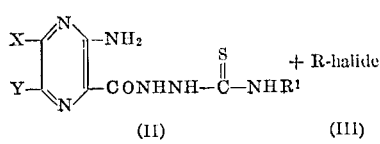

(II)          (III)

wherein in each of the foregoing structures X is selected from hydrogen and an amino having the structure —NR⁵R⁶ wherein R⁵ is selected from
(1) hydrogen,
(2) lower alkyl and
(3) lower alkenyl;

R⁶ is selected from
(1) hydrogen,
(2) lower alkenyl,
(3) lower alkynyl,
(4) $C_{3-7}$ cycloalkyl,
(5) phenyl and substituted phenyl, wherein the substituent(s) are selected from halogen, lower alkyl and lower alkoxy,
(6) lower alkoxy,
(7) pyridylamino and pentamethyleneamino,
(8) lower alkyl and substituted lower alkyl wherein the substituent(s) are selected from
  (a) lower alkoxy,
  (b) $C_{3-6}$ cycloalkyl,
  (c) furyl,
  (d) pyridyl,
  (e) phenyl and substituted phenyl wherein the substituent(s) are selected from halogen, lower alkyl and lower alkoxy,
  (f) —NR⁷R⁸ wherein R⁷ is selected from
    (i) lower alkyl and
    (ii) lower alkylcarbonyl,
  R⁸ is lower alkyl and R⁷ and R⁸ taken together with the nitrogen to which they are attached form a 5 or 6 membered ring selected from piperidino, pyrrolidinyl, morpholino, piperazinyl, N-lower alkyl piperazinyl, and R⁵ and R⁶ taken together with the nitrogen to which they are attached form a 5 to 6 membered ring selected from piperidino, pyrrolidinyl, morpholino, piperazinyl and N-lower alkyl piperazinyl;

Y is selected from hydrogen, lower alkyl, halogen and phenyl; R is selected from lower alkyl, phenyl-lower alkyl, lower alkyl-phenyl-lower alkyl and halophenyl-lower alkyl; R¹ is selected from hydrogen, lower alkyl, lower alkenyl, phenyl, halophenyl, phenyl-lower alkyl and diphenyl-lower alkyl.

2. A process as claimed in claim 1 wherein the reaction is carried out in the presence of a solvent.

3. A process for the preparation of 1-(3,5-diamino-6-chloropyrazinoyl)-3-methyl - 3-thioisosemicarbazide comprising the reaction of 1-(3,5-diamino-6-chloropyrazinoyl)-thiosemicarbazide and a methyl halide in a lower alkanol in the presence of a base.

4. A process for the preparation of 1-(3-aminopyrazinoyl)-3-substituted-thioisosemicarbazide having the structure

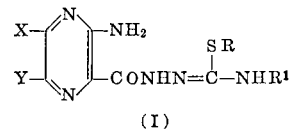

(I)

characterized in that an acrylamide of structure VI is caused to react with a 3-substituted-3-thioisosemicarbazide of structure VII

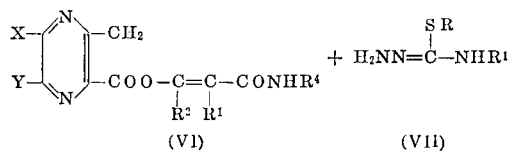

(VI)          (VII)

wherein in each of the foregoing structures X, Y, R and R¹ have the meaning assigned in claim 1, R² is selected from lower alkyl, phenyl, lower alkyl-substituted phenyl and phenyl substituted with a sulfonate anion; $R^3$ is selected from hydrogen and a hydrocarbon radical which when linked to $R^2$ forms with the carbon atoms to which $R^2$ and $R^3$ are joined an ortho-phenylene group; and $R^4$ is lower alkyl.

5. A process as claimed in claim 4 wherein the reaction is carried out in the presence of a solvent and with heating.

6. A process as claimed in claim 5 wherein N-(lower alkyl)-3-(3,5 - diamino-6-chloropyrazinoyloxy) - acrylamide and 3-methyl-3-thioisosemicarbazide are caused to react to form 1-(3,5-diamino-6-chloropyrazinoyl)-3-methyl-3-thioisosemicarbazide.

7. A compound having the structure

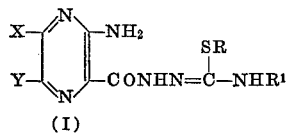

(I)

and pharmacologically acceptable salts thereof wherein X is selected from hydrogen and an amino having the structure —$NR^5R^6$ wherein $R^5$ is selected from
   (1) hydrogen,
   (2) lower alkyl and
   (3) lower alkenyl;
$R^6$ is selected from
   (1) hydrogen,
   (2) lower alkenyl,
   (3) lower alkynyl,
   (4) C3–7 cycloalkyl,
   (5) phenyl and substituted phenyl, wherein the substituent(s) are selected from halogen, lower alkyl and lower alkoxy,
   (6) lower alkoxy,
   (7) pyridylamino and pentamethyleneamino,
   (8) lower alkyl and substituted lower alkyl wherein the substituent(s) are selected from
     (a) lower alkoxy,
     (b) C3–6 cycloalkyl,
     (c) furyl,
     (d) pyridyl,
     (e) phenyl and substituted phenyl wherein the substituent(s) are selected from halogen, lower alkyl and lower alkoxy,
     (f) —$NR^7R^8$ wherein $R^7$ is selected from
       (i) lower alkyl and
       (ii) lower alkylcarbonyl,
   $R^8$ is lower alkyl and $R^7$ and $R^8$ taken together with the nitrogen to which they are attached form a 5 or 6 membered ring selected from piperidino, pyrrolidinyl, morpholino, piperazinyl, N-lower alkyl piperazinyl, and
$R^5$ and $R^6$ taken together with the nitrogen to which they are attached form a 5 to 6 membered ring selected from piperidino, pyrrolidinyl, morpholino, piperazinyl and N-lower alkyl piperazinyl;

Y is selected from hydrogen, lower alkyl, halogen and phenyl; R is selected from lower alkyl, phenyl-lower alkyl, lower alkyl-phenyl-lower alkyl and halophenyl-lower alkyl; $R^1$ is selected from hydrogen, lower alkyl, lower alkenyl phenyl, halophenyl, phenyl-lower alkyl and diphenyl-lower alkyl.

8. A compound as claimed in claim 7 wherein X is amino, R is lower alkyl and $R^1$ is hydrogen.

9. A compound as claimed in claim 7 wherein X is amino, Y is chloro, R is methyl and $R^1$ is hydrogen.

10. A compound as claimed in claim 7 wherein X is amino, Y is chloro, R is methyl and $R^1$ is allyl.

References Cited
UNITED STATES PATENTS
3,444,165   5/1969   Pollack et al. _____ 260—250
3,472,848   10/1969   Cragoe et al. _____ 260—250

NICHOLAS S. RIZZO, Primary Examiner

U.S. Cl. X.R.

260—247.1; 424—250

UNITED STATES PATENT OFFICE
CERTIFICATE OF CORRECTION

Patent No. 3,555,023  Dated January 12, 1971

Inventor(s) Edward J. Cragoe, Jr. and Kenneth L. Shepard

It is certified that error appears in the above-identified patent and that said Letters Patent are hereby corrected as shown below:

In column 4, line 45, correct structure XII to appear as follows:

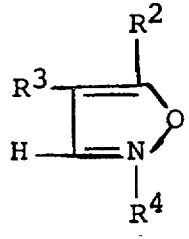

In Table II, Preparation B-33, in the "M.P. °C." column change "13-46" to read ---134-6---; and Preparation B-55, in the "Y" column, change "DH₃" to read ---CH₃---. In Column 13, line 70, change the empirical formula to read ---$C_9H_{11}ClN_6OS$---. In column 14, line 22, change melt point to read ---207-208.5° C.---; and in line 73, change "5.8 g." to read ---5.89 g.---. In Table III, in Preparation C-25, in the structure in the "X" column, change "CHNH₂" to read ---CH₂NH---. In Table IV, Example 11, in the structure in the "X" column, change the ring to read as follows:

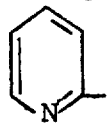

in Example 32, change the structure in the "X" column to read ---$(CH_3)_2N(CH_2)_3NH$- ---. In Table VI, Preparation E-10, in the "Z⊖" column, change "ClO⊖" to read ---$ClO_4$⊖---; in Preparation E-12, correct the structure in the "X" column to read as follows:

in Preparation E-13, correct the structure in the "R²" column to read as follows:

UNITED STATES PATENT OFFICE
CERTIFICATE OF CORRECTION

Patent No. 3,555,023      Dated January 12, 1971

Inventor(s) Edward J. Cragoe, Jr. and Kenneth L. Shepard

It is certified that error appears in the above-identified patent
and that said Letters Patent are hereby corrected as shown below:

PAGE - 2

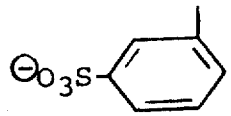

in Preparation E-15, in the structure in the "$Z^\ominus$" column, cha
"ON" to read ---$O_2N$---. In Table VII, Example 73, correct th
structure in column "X" to read --- $HC\equiv C-CH_2-NH-$ ---. In col
umn 35, line 59, change "zinol" to read ---zinoyl---. In col
umn 36, lines 65-70, correct structure VI to read as follows:

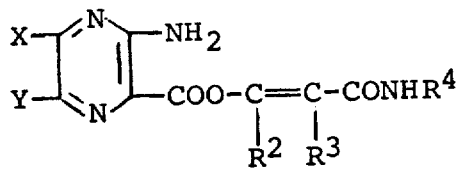

Signed and sealed this 31st day of August 1971.

(SEAL)
Attest:

EDWARD M. FLETCHER, JR.
Attesting Officer

WILLIAM E. SCHUYLER, JR
Commissioner of Patents